United States Patent
Hosseini et al.

(10) Patent No.: US 11,265,876 B2
(45) Date of Patent: Mar. 1, 2022

(54) UPLINK POWER MODIFICATION AND COMMUNICATION SCHEME CHANGE REQUESTS

(71) Applicant: QUALCOMM Incorporated, San Diego, CA (US)

(72) Inventors: Seyedkianoush Hosseini, San Diego, CA (US); Chih-Ping Li, San Diego, CA (US); Wanshi Chen, San Diego, CA (US); Tingfang Ji, San Diego, CA (US)

(73) Assignee: Qualcomm Incorproated, San Diego, CA (US)

( * ) Notice: Subject to any disclaimer, the term of this patent is extended or adjusted under 35 U.S.C. 154(b) by 0 days.

(21) Appl. No.: 16/534,775

(22) Filed: Aug. 7, 2019

(65) Prior Publication Data
US 2020/0053730 A1    Feb. 13, 2020

Related U.S. Application Data

(60) Provisional application No. 62/717,343, filed on Aug. 10, 2018.

(51) Int. Cl.
*H04L 12/28* (2006.01)
*H04W 72/04* (2009.01)
(Continued)

(52) U.S. Cl.
CPC ... *H04W 72/0446* (2013.01); *H04W 72/1284* (2013.01); *H04W 72/14* (2013.01)

(58) Field of Classification Search
CPC ............. H04L 5/0094; H04W 52/146; H04W 72/1268; H04W 72/1278; H04W 72/0446
(Continued)

(56) References Cited

U.S. PATENT DOCUMENTS 10,142,962 B2 * 11/2018 Lee ........................ H04L 1/189
2017/0288817 A1    10/2017 Cao et al.
(Continued)

OTHER PUBLICATIONS

Intel Corporation: "Support of Link Adaptation for UL Grant-free NOMA Schemes," 3GPP Draft; R1-1610374 LA Grant-Freenoma, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016, XP051150385, 4 pages, Retrieved from the Internet: URL: http://www.3gpp.org/ftp/Meetings_3GPP_SYNC/RAN1/Docs/ [retrieved on Oct. 9, 2016].
(Continued)

*Primary Examiner* — John Pezzlo
(74) *Attorney, Agent, or Firm* — Shankar Krithivasan

(57) ABSTRACT

Methods, systems, and devices for wireless communications are described. A user equipment (UE) may use an increased transmit power for one or more instances of an autonomous uplink transmission. For example, a UE may be configured with a repetition window including multiple transmission time intervals (TTIs) and may identify a subset of TTIs within the window that may be unavailable for autonomous uplink transmissions. The UE may adjust transmit power or transmit a scheduling request based on the presence of unavailable TTIs. In some examples, the UE may increase the transmit power by an amount that is based on a number of unavailable TTIs, or a fixed amount, or a combination thereof. In some examples, a UE with limited transmit power (e.g., under a maximum transmit power) may dynamically transmit a report to a base station that includes a request to modify a communications scheme used by the UE.

30 Claims, 20 Drawing Sheets

(51) Int. Cl.
*H04W 72/14* (2009.01)
*H04W 72/12* (2009.01)
*H04J 1/16* (2006.01)

(58) Field of Classification Search
USPC .......................................... 370/311, 329, 442
See application file for complete search history.

(56) References Cited

U.S. PATENT DOCUMENTS

| | | | | |
|---|---|---|---|---|
| 2018/0249509 | A1* | 8/2018 | Yi | H04W 48/16 |
| 2021/0014003 | A1* | 1/2021 | Sundberg | H04L 1/1896 |
| 2021/0022117 | A1* | 1/2021 | Yi | H04L 5/0048 |
| 2021/0243749 | A1* | 8/2021 | Hoang | H04W 28/26 |

OTHER PUBLICATIONS

LG Electronics: "Discussion on UL Transmission without Grant," 3GPP Draft; R11713189 Discussion on UL Transmission Without Grant, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 20, 2017, XP051315998, 8 pages, Retrieved from the Internet: URL: http://www.3gpp.org/ftp/Meetings_3GPP_SYNC/RAN1/Docs/ [retrieved on Aug. 20, 2017] section 4.
Partial International Search Report—PCT/US2019/045746—ISA/EPO—dated Oct. 1, 2019.
Huawei, et al., "Reliability Enhancement for Grant-Free Transmission", 3GPP Draft; R11804296, 3rd Generation Partnership Project (3GPP), Mobile Competence Centre, 650, Route Des Lucioles; F-06921 Sophia-Antipolis Cedex, France, vol. Ran WG1, No. Sanya, China; Apr. 16, 2018-Apr. 20, 2018, Apr. 15, 2018 (Apr. 15, 2018), 6 pages, XP051426584, Retrieved from the Internet: URL: http://www.3gpp.org/ftp/Meetings_3GPP_SYNC/RAN1/Docs/ [retrieved on Apr. 15, 2018], Section 3-Section 4.
International Search Report and Written Opinion—PCT/US2019/045746—ISA/EPO—dated Nov. 26, 2019.

* cited by examiner

UPLINK POWER MODIFICATION AND COMMUNICATION SCHEME CHANGE REQUESTS

CROSS REFERENCE

The present application for patent claims the benefit of U.S. Provisional Patent Application No. 62/717,343 by Hosseini et al., entitled "UPLINK POWER MODIFICATION AND COMMUNICATION SCHEME CHANGE REQUESTS," filed Aug. 10, 2018, assigned to the assignee hereof, and expressly incorporated by reference in its entirety.

FIELD OF TECHNOLOGY

The following relates generally to wireless communications, and more specifically to uplink power modification and communication scheme change requests.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-orthogonal frequency-division multiplexing (DFT-S-OFDM). A wireless multiple-access communications system may include a number of base stations or network access nodes, each simultaneously supporting communication for multiple communication devices, which may be otherwise known as user equipment (UE).

A wireless communications system may utilize a grant-based transmission scheme where, for example, a UE requests time-frequency resources for performing an uplink transmission. A UE may request such resources by transmitting a scheduling request (SR) to a base station, and the base station may transmit an uplink grant to the UE. Additionally or alternatively, wireless communications systems may support a grant-free transmission scheme, which may be referred to as an autonomous uplink scheme, in which time-frequency resources may be allocated to one or more UEs (e.g., via a configuration provided by the base station) and UEs may use these resources for uplink transmissions without transmitting an SR. Accordingly, such autonomous uplink transmission schemes may reduce signaling overhead associated with the SR and subsequent grant, thereby enhancing system efficiency. In order to enhance reliability for autonomous uplink transmissions, the configured resources may include resources that are available for retransmissions of an uplink transmission, which may enhance the reliability of the uplink transmission being successfully received.

SUMMARY

The described techniques relate to improved methods, systems, devices, and apparatuses that support uplink power modification and communication scheme change requests. Generally, the described techniques provide for autonomous uplink transmissions from a user equipment (UE) to a base station. In some cases, a configuration may indicate initial resources for an initial uplink transmission slot and retransmission resources for a number of retransmissions (e.g., where the initial and retransmission resources include a repetition window) in which a UE may repeat uplink transmissions to improve the likelihood of successful delivery of the transmission. In some cases, a UE may have a reduced number of available retransmission resources (e.g., the UE may have to skip an uplink transmission opportunity within a repetition window, such as when a transmission time interval (TTI) within the window is reserved for downlink communications). As a result of a reduced number of uplink retransmission opportunities, the UE may be configured to increase its uplink transmit power for the remaining uplink retransmission opportunities within the repetition window, which may increase the reliability of transmitted transport blocks (TBs). Additionally or alternatively, the UE may transmit a scheduling request due to the reduced number of retransmission resources, thereby enabling the UE to receive configured resources (e.g., via a resource grant) from the base station.

Various techniques are also described for real-time reporting of a UE's power headroom to a base station. In some cases, a base station may not be aware that a UE is operating in a power limited mode and may, inadvertently, configure and communicate with the UE using techniques that limit the UEs available transmit power. For example, a UE may be power limited when the power needed by the UE to transmit uplink data exceeds the maximum transmit power of the UE. In some cases, a UE operating with high-priority communications, for example, communications having reliability and latency requirements above a threshold level (e.g., ultra-reliable low latency communications (URLLC)) may benefit from using a real-time report indicating a remaining transmit power available to the UE (e.g., a power headroom report (PHR)) to more frequently inform a base station about the UE's power availability or restrictions (e.g., as compared to some devices using conventional power headroom reporting techniques). As such, the UE may also request modification of communication configurations for the UE (e.g., to configurations that use less power) when it is identified that the UE is power limited. Such techniques may be used to improve the UE's ability to conserve power and ensure the UE has enough power headroom should an increased transmit power be needed.

A method of wireless communication at a UE is described. The method may include receiving a configuration for a repetition window including a set of transmission time intervals (TTIs), the repetition window configured for sending a set of instances of an autonomous uplink transmission using the set of TTIs, identifying, from the set of TTIs, a first subset of TTIs that is unavailable for sending the set of instances of the autonomous uplink transmission, determining a second subset of TTIs from the set of TTIs that is available for sending the set of instances of the autonomous uplink transmission, and transmitting, based at least in part on identifying the first subset of TTIs that is unavailable, instances of the autonomous uplink transmission using the second subset of TTIs with an increased transmit power, or a scheduling request (SR), or a combination thereof.

An apparatus for wireless communication at a UE is described. The apparatus may include a processor, memory in electronic communication with the processor, and instructions stored in the memory. The instructions may be executable by the processor to cause the apparatus to receive a configuration for a repetition window including a set of TTIs, the repetition window configured for sending a set of instances of an autonomous uplink transmission using the set of TTIs, identify, from the set of TTIs, a first subset of TTIs that is unavailable for sending the set of instances of the autonomous uplink transmission, determine a second subset of TTIs from the set of TTIs that is available for sending the set of instances of the autonomous uplink transmission, and transmit, based at least in part on identifying the first subset of TTIs that is unavailable, instances of the autonomous uplink transmission using the second subset of TTIs with an increased transmit power, or a scheduling request (SR), or a combination thereof.

Another apparatus for wireless communication at a UE is described. The apparatus may include means for receiving a configuration for a repetition window including a set of TTIs, the repetition window configured for sending a set of instances of an autonomous uplink transmission using the set of TTIs, identifying, from the set of TTIs, a first subset of TTIs that is unavailable for sending the set of instances of the autonomous uplink transmission, determining a second subset of TTIs from the set of TTIs that is available for sending the set of instances of the autonomous uplink transmission, and transmitting, based at least in part on identifying the first subset of TTIs that is unavailable, instances of the autonomous uplink transmission using the second subset of TTIs with an increased transmit power, or a scheduling request (SR), or a combination thereof.

A non-transitory computer-readable medium storing code for wireless communication at a UE is described. The code may include instructions executable by a processor to receive a configuration for a repetition window including a set of TTIs, the repetition window configured for sending a set of instances of an autonomous uplink transmission using the set of TTIs, identify, from the set of TTIs, a first subset of TTIs that is unavailable for sending the set of instances of the autonomous uplink transmission, determine a second subset of TTIs from the set of TTIs that is available for sending the set of instances of the autonomous uplink transmission, and transmit, based at least in part on identifying the first subset of TTIs that is unavailable, instances of the autonomous uplink transmission using the second subset of TTIs with an increased transmit power, or a scheduling request (SR), or a combination thereof.

Some examples of the method, apparatuses, and non-transitory computer-readable medium described herein may further include operations, features, means, or instructions for receiving, from a base station, an indication of a UE-specific power value, where the transmit power may be increased by the UE-specific power value. In some examples of the method, apparatuses, and non-transitory computer-readable medium described herein, the configuration may be received via radio resource control (RRC) signaling. In some examples of the method, apparatuses, and non-transitory computer-readable medium described herein, the configuration may be received via signaling that activates or modifies autonomous uplink transmissions at the UE.

Some examples of the method, apparatuses, and non-transitory computer-readable medium described herein may further include operations, features, means, or instructions for determining a power value based on a number of TTIs in the first subset of TTIs that may be unavailable, where the transmit power may be increased by the determined power value.

Some examples of the method, apparatuses, and non-transitory computer-readable medium described herein may further include operations, features, means, or instructions for determining a power value based on a ratio between a first number of TTIs in the first subset of TTIs and a second number of TTIs in the second subset of TTIs, where the transmit power may be increased by the determined power value.

Some examples of the method, apparatuses, and non-transitory computer-readable medium described herein may further include operations, features, means, or instructions for determining a preconfigured power value based on a presence of the first subset of TTIs that may be unavailable, where the transmit power may be increased by the preconfigured power value. Some examples of the method, apparatuses, and non-transitory computer-readable medium described herein may further include operations, features, means, or instructions for receiving a resource grant for a set of uplink resources in response to transmitting the SR. Some examples of the method, apparatuses, and non-transitory computer-readable medium described herein may further include operations, features, means, or instructions for transmitting data on the set of uplink resources based at least in part on the first subset of TTIs that is unavailable.

In some examples of the method, apparatuses, and non-transitory computer-readable medium described herein, the first subset of TTIs that may be unavailable may include TTIs configured for downlink transmissions, TTIs having reserved resources, or a combination thereof. In some examples of the method, apparatuses, and non-transitory computer-readable medium described herein, the set of TTIs may include a set of respective slots, mini-slots, symbol periods, or a combination thereof.

A method of wireless communication at a base station is described. The method may include transmitting, to a UE, a configuration of periodic repetition windows including a set of TTIs, each repetition window being configured for receiving a set of instances of an autonomous uplink transmission using the set of TTIs and receiving, during a repetition window, instances of the autonomous uplink transmission having a transmit power increased by a power value, or an SR, or a combination thereof based on a subset of TTIs from the set of TTIs being unavailable for receiving the instances of the autonomous uplink transmission.

An apparatus for wireless communication at a base station is described. The apparatus may include a processor, memory in electronic communication with the processor, and instructions stored in the memory. The instructions may be executable by the processor to cause the apparatus to transmit, to a UE, a configuration of periodic repetition windows including a set of TTIs, each repetition window being configured for receiving a set of instances of an autonomous uplink transmission using the set of TTIs and receive, during a repetition window, instances of the autonomous uplink transmission having a transmit power increased by a power value, or an SR, or a combination thereof based on a subset of TTIs from the set of TTIs being unavailable for receiving the instances of the autonomous uplink transmission.

Another apparatus for wireless communication at a base station is described. The apparatus may include means for transmitting, to a UE, a configuration of periodic repetition windows including a set of TTIs, each repetition window being configured for receiving a set of instances of an autonomous uplink transmission using the set of TTIs and receiving, during a repetition window, instances of the autonomous uplink transmission having a transmit power increased by a power value, or an SR, or a combination thereof based on a subset of TTIs from the set of TTIs being unavailable for receiving the instances of the autonomous uplink transmission.

A non-transitory computer-readable medium storing code for wireless communication at a base station is described. The code may include instructions executable by a processor to transmit, to a UE, a configuration of periodic repetition windows including a set of TTIs, each repetition window being configured for receiving a set of instances of an autonomous uplink transmission using the set of TTIs and receive, during a repetition window, instances of the autonomous uplink transmission having a transmit power increased by a power value, or an SR, or a combination thereof based on a subset of TTIs from the set of TTIs being unavailable for receiving the instances of the autonomous uplink transmission.

Some examples of the method, apparatuses, and non-transitory computer-readable medium described herein may further include operations, features, means, or instructions for transmitting, to the UE, an indication of the power value to increase the transmit power, where the power value may include a power value that may be specific to the UE.

In some examples of the method, apparatuses, and non-transitory computer-readable medium described herein, the indication may be transmitted via RRC signaling. In some examples of the method, apparatuses, and non-transitory computer-readable medium described herein, the indication may be transmitted via signaling that activates or modifies autonomous uplink transmissions at the UE. In some examples of the method, apparatuses, and non-transitory computer-readable medium described herein, the power value may be based on a number of TTIs in the subset of TTIs.

In some examples of the method, apparatuses, and non-transitory computer-readable medium described herein, the power value may be based on a ratio between a first number of TTIs in the subset of TTIs and a second number of TTIs in a second subset of TTIs that may be available for receiving the instances of the autonomous uplink transmission.

Some examples of the method, apparatuses, and non-transitory computer-readable medium described herein may further include operations, features, means, or instructions for determining a preconfigured power value to increase the transmit power based on a presence of the subset of TTIs that may be unavailable, where the transmit power may be increased by the preconfigured power value.

Some examples of the method, apparatuses, and non-transitory computer-readable medium described herein may further include operations, features, means, or instructions for configuring a set of uplink resources in response to receiving the SR. Some examples of the method, apparatuses, and non-transitory computer-readable medium described herein may further include operations, features, means, or instructions for transmitting a resource grant indicating the set of uplink resources.

In some examples of the method, apparatuses, and non-transitory computer-readable medium described herein, the subset of TTIs may include TTIs configured for downlink transmissions, TTIs having reserved resources, or a combination thereof.

A method of wireless communication at a UE is described. The method may include calculating a difference between a maximum transmit power and a transmit power to be used for transmitting uplink data to a base station on one or more carriers of a cell, where the cell may be configured for high-priority communications (e.g., communications having reliability and latency requirements above a threshold level), determining a transmit power limitation based on the calculated difference, and transmitting a request to modify a communication scheme used for communicating with the base station, the request based on the determined transmit power limitation.

An apparatus for wireless communication at a UE is described. The apparatus may include a processor, memory in electronic communication with the processor, and instructions stored in the memory. The instructions may be executable by the processor to cause the apparatus to calculate a difference between a maximum transmit power and a transmit power to be used for transmitting uplink data to a base station on one or more carriers of a cell, where the cell may be configured for high-priority communications (e.g., communications having reliability and latency requirements above a threshold level), determine a transmit power limitation based on the calculated difference, and transmit a request to modify a communication scheme used for communicating with the base station, the request based on the determined transmit power limitation.

Another apparatus for wireless communication at a UE is described. The apparatus may include means for calculating a difference between a maximum transmit power and a transmit power to be used for transmitting uplink data to a base station on one or more carriers of a cell, where the cell may be configured for high-priority communications (e.g., communications having reliability and latency requirements above a threshold level), determining a transmit power limitation based on the calculated difference, and transmitting a request to modify a communication scheme used for communicating with the base station, the request based on the determined transmit power limitation.

A non-transitory computer-readable medium storing code for wireless communication at a UE is described. The code may include instructions executable by a processor to calculate a difference between a maximum transmit power and a transmit power to be used for transmitting uplink data to a base station on one or more carriers of a cell, where the cell may be configured for high-priority communications (e.g., communications having reliability and latency requirements above a threshold level), determine a transmit power limitation based on the calculated difference, and transmit a request to modify a communication scheme used for communicating with the base station, the request based on the determined transmit power limitation.

In some examples of the method, apparatuses, and non-transitory computer-readable medium described herein, transmitting the request to modify the communication scheme may include operations, features, means, or instructions for transmitting the request via a medium access control (MAC) control element (CE), scheduling request (SR) resources, a set of configured resources, or a combination thereof.

In some examples of the method, apparatuses, and non-transitory computer-readable medium described herein, determining the transmit power limitation may include operations, features, means, or instructions for determining that the difference between the maximum transmit power and the transmit power to be used for transmitting uplink data satisfies a threshold, where the request to modify the communication scheme may be transmitted based on the difference satisfying the threshold.

Some examples of the method, apparatuses, and non-transitory computer-readable medium described herein may further include operations, features, means, or instructions for determining that path loss for one or more downlink reference signals in the cell satisfies a path loss threshold, where transmitting the request to modify the communication scheme may be based on the path loss satisfying the path loss threshold.

In some examples of the method, apparatuses, and non-transitory computer-readable medium described herein, the request to modify the communication scheme may include a request for a waveform change, a request for a modulation order change, or a combination thereof.

In some examples of the method, apparatuses, and non-transitory computer-readable medium described herein, the high-priority communications may have reliability and latency requirements above a threshold level.

A method of wireless communication at a base station is described. The method may include receiving, from a UE, a request to modify a communication scheme used for communicating with the base station on one or more carriers of a cell, the request based on a power limitation of the UE, where the cell may be configured for high-priority communications (e.g., communications having reliability and latency requirements above a threshold level) and modifying the communication scheme based on the received request, where modifying the communication scheme may include modifying a waveform, modifying a modulation order, or a combination thereof.

An apparatus for wireless communication at a base station is described. The apparatus may include a processor, memory in electronic communication with the processor, and instructions stored in the memory. The instructions may be executable by the processor to cause the apparatus to receive, from a UE, a request to modify a communication scheme used for communicating with the base station on one or more carriers of a cell, the request based on a power limitation of the UE, where the cell may be configured for high-priority communications (e.g., communications having reliability and latency requirements above a threshold level) and modify the communication scheme based on the received request, where modifying the communication scheme may include modifying a waveform, modifying a modulation order, or a combination thereof.

Another apparatus for wireless communication at a base station is described. The apparatus may include means for receiving, from a UE, a request to modify a communication scheme used for communicating with the base station on one or more carriers of a cell, the request based on a power limitation of the UE, where the cell may be configured for high-priority communications (e.g., communications having reliability and latency requirements above a threshold level) and modifying the communication scheme based on the received request, where modifying the communication scheme may include modifying a waveform, modifying a modulation order, or a combination thereof.

A non-transitory computer-readable medium storing code for wireless communication at a base station is described. The code may include instructions executable by a processor to receive, from a UE, a request to modify a communication scheme used for communicating with the base station on one or more carriers of a cell, the request based on a power limitation of the UE, where the cell may be configured for high-priority communications (e.g., communications having reliability and latency requirements above a threshold level) and modify the communication scheme based on the received request, where modifying the communication scheme may include modifying a waveform, modifying a modulation order, or a combination thereof.

Some examples of the method, apparatuses, and non-transitory computer-readable medium described herein may further include operations, features, means, or instructions for modifying the communication scheme based on coordinating interference reduction with one or more neighboring cells.

Some examples of the method, apparatuses, and non-transitory computer-readable medium described herein may further include operations, features, means, or instructions for transmitting, to the UE, an indication of a set of configured resources for sending the request to modify the communication scheme, where the request may be received on the set of configured resources.

In some examples of the method, apparatuses, and non-transitory computer-readable medium described herein, receiving the request to modify the communication scheme may include operations, features, means, or instructions for receiving the request via a MAC-CE, SR resources, a set of configured resources, or a combination thereof.

In some examples of the method, apparatuses, and non-transitory computer-readable medium described herein, the high-priority communications may have reliability and latency requirements above a threshold level.

DETAILED DESCRIPTION

Figure 1:
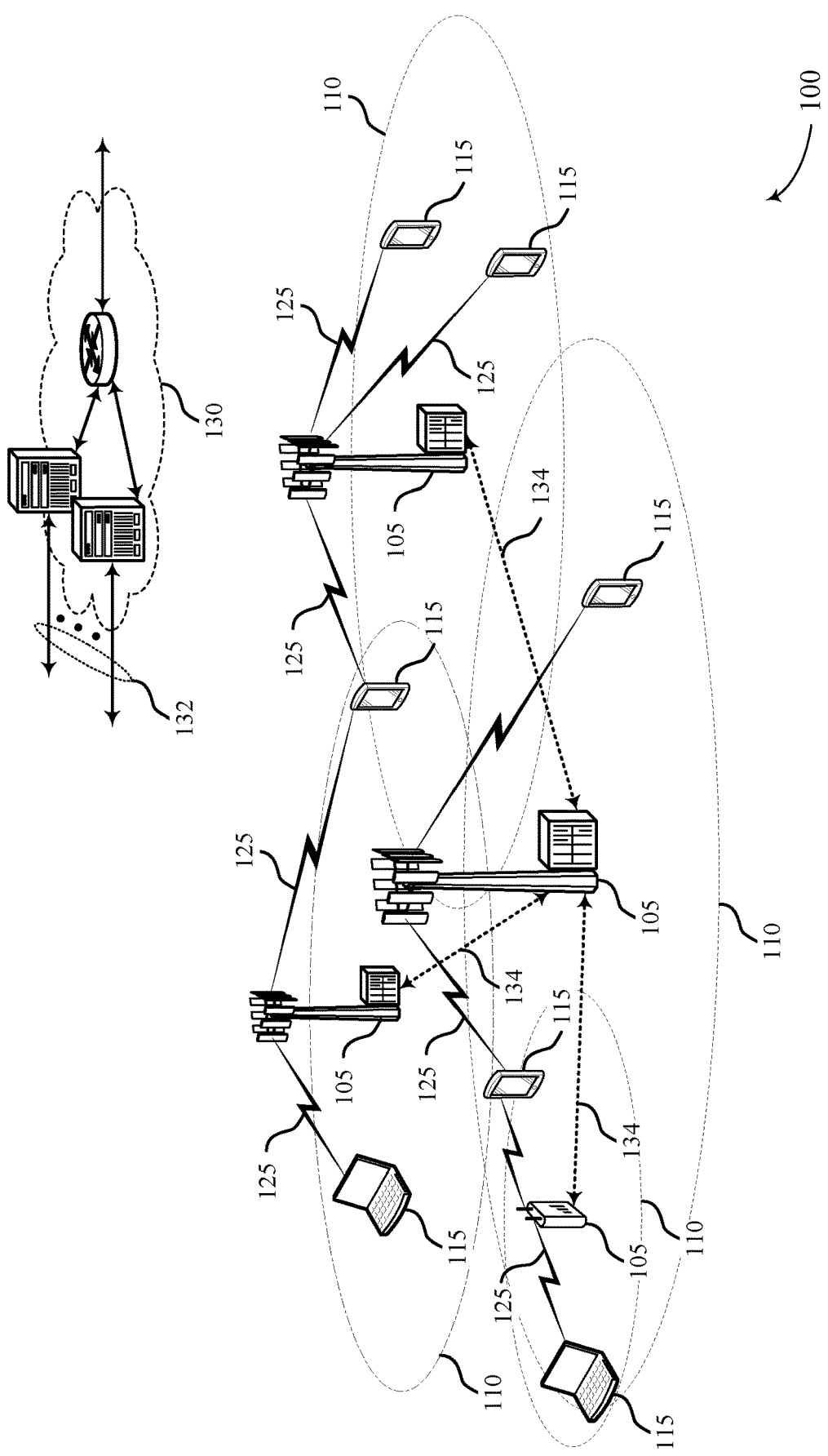
FIG. 1 illustrates an example of a wireless communications system that supports uplink power modification and communication scheme change requests in accordance with aspects of the present disclosure.

Various aspects of the present disclosure provide improved methods, systems, devices, and apparatuses that support uplink power modification and communication scheme change requests and power headroom reporting. Generally, the described techniques provide for autonomous uplink transmissions from a user equipment (UE) to a base station. In some cases, a configuration may indicate initial resources for an initial uplink transmission slot and retransmission resources for a number of retransmissions, in which a UE may repeat uplink transmissions to improve the likelihood of successful delivery of the transmission. Sometimes, a UE may have a reduced number of available retransmission resources (e.g., the UE may have to skip an uplink opportunity when a transmission time interval (TTI) is reserved for downlink communications). As a result of a reduced number of uplink retransmission opportunities, the UE may be configured to increase its uplink transmit power for the remaining uplink retransmission opportunities to increase the reliability of delivering the transport block (TB).

As indicated above, autonomous uplink transmissions may enhance system efficiency through reduced signaling overhead. For example, when utilizing a grant-based transmission scheme to indicate time-frequency resources on which a UE or a base station may transmit data, a UE that has data to transmit may transmit an SR to a base station, and the base station may reply to the UE with an uplink grant indicating resources on which to transmit the data. The UE may then use the assigned resources to transmit the data. This grant-based uplink operation, however, incurs a delay from the time at which data becomes available at the UE to transmit and the time at which the UE transmits the data on the assigned resources.

Autonomous uplink transmissions (e.g., uplink transmissions without a configured resource grant) may help reduce latency and signaling overhead associated with exchanging the SR and the grant. In some cases, a base station may configure the UE (e.g., via a configured grant that is provided via radio resource control (RRC) signaling) with one or more sets of resources for a set of channels on which the UE may transmit data without having first received an uplink grant. In some cases, a configuration may indicate initial resources for an initial uplink transmission and retransmission resources for a number of retransmissions (e.g., where the initial and retransmission resources include a repetition window), in which a UE may repeat uplink transmissions to improve the likelihood of successful receipt (and decoding) of the transmission. In some examples, the UE may be configured with multiple grant configurations (e.g., configured by a network or base station), which may include some configurations for high-priority communications and some for low-priority communications. The priority of a configuration may be indicated to the UE as part of a configuration or may be based on a logical channel prioritization procedure performed, for example, by medium access control (MAC) procedures. For instance, the priority of a configuration may be based on the logical channel from which data is mapped to an uplink configured grant configuration.

In some cases, a UE may have a reduced number of available retransmission resources (e.g., the UE may have to skip an uplink transmission opportunity within a repetition window, such as when a TTI within the window is reserved for downlink communications). As a result of a reduced number of uplink retransmission opportunities, the UE may be configured to increase its uplink transmit power for the remaining uplink retransmission opportunities within the repetition window, which may increase the reliability of transmitted TBs. Such retransmissions may help enhance system reliability because the base station may not detect the initial data transmission from the UE. Further, because the UE may not indicate that a transmission has occurred, the base station may not send feedback to indicate a decoding failure. Thus, the configuration information may indicate a number of repetitions to be provided (e.g., the configuration conveys a repetition factor, K, that indicates the number of times the UE may repeat each transmission). Further, such autonomous uplink transmissions may be utilized in a high-priority service that requires high reliability and low latency (e.g., an ultra-reliability low latency communication (URLLC) service), and enhanced reliability for autonomous uplink transmissions may thus help to meet reliability criteria of such services. The UE may operate in a mode configured for high-priority uplink transmissions (e.g., URLLC) based on implicit or explicit indications (e.g., based on network conditions or direct signaling to the UE).

In some cases, a UE may not be guaranteed enough resources to complete the number of repetitions indicated by the repetition factor when a UE skips an uplink opportunity (e.g., TTI). As described herein, the UE may increase its transmit power for uplink transmissions and/or transmit a scheduling request (SR) when one or more TTIs (e.g., slots, mini slots, etc.) are skipped for uplink transmission. For instance, the UE may transmit at a higher power during the remaining TTI(s) available after a UE skips the one or more TTIs (as compared to a power used in cases where one or more TTIs had not been skipped). For instance, the UE may increase its transmit power for a subset of TTIs by a value that is proportional to, or based on, a number of TTIs. In other examples, the UE may increase its transmit power by a fixed value upon determining that one or more TTIs are not available for repetitions of an autonomous uplink transmission. In some cases, the increase in transmit power at the UE may improve the likelihood of successful delivery of the TB to a base station. In some examples, the UE may transmit the SR to the base station when one or more TTIs are skipped for uplink transmission so as to ensure that, even though TTIs are skipped, the UE may receive uplink resources for data transmissions. In some cases, the UE may transmit the SR while also increasing the transmit power of the repetitions of the autonomous uplink transmission.

Various techniques are also described for real-time reporting of a UE's power headroom to a base station. In some cases, a base station may not be aware that a UE is operating in a power limited mode and may configure a communications scheme for the UE that uses excessive power. A UE operating with high-priority communications (e.g., a configured mode of operation, such as URLLC, which may have features implicitly or explicitly indicated to the UE) may benefit from using a real-time power headroom report (PHR) to inform a base station more frequently about the UE's power availability or restrictions. The UE may also request updated communication configurations (e.g., configurations that use less power) based on the frequent power headroom measurements. For instance, using real-time reporting of a power headroom, the UE may dynamically request changes to a modulation order, or changes to a waveform used to communicate, and the like. In such cases, the requests transmitted by the UE may improve the UE's ability to conserve power and have enough power when an increased transmit power may be needed (such as in cases where the UE has additional data to transmit).

In one example, a single UE may be operating in an autonomous uplink mode with a repetition window, and the UE may increase an uplink transmit power for a number of uplink TTIs. In this example, the UE may report that more power headroom is needed for the increased uplink transmit power. The report may include a request for waveform change and/or a modulation order change in order to increase the power headroom of the UE.

Particular aspects of the subject matter described herein may be implemented to realize one or more advantages. The described methods, systems, devices, and apparatuses provide techniques which may support uplink power modification and communication scheme change requests. As such, supported techniques may include features for a UE to increase uplink transmit power (e.g., in cases of a reduced number of uplink retransmission opportunities), which may increase system reliability (e.g., reliability of TBs transmitted to a base station). Additionally, the improved techniques provide for modifying a communication scheme (e.g., a waveform change, a modulation order change, transmit power increase) between a UE and a base station based on power limitations of the UE (e.g., power headroom, available transmit power), which may improve the UE's ability to conserve power.

Aspects of the disclosure are initially described in the context of a wireless communications system. Aspects of the disclosure are further illustrated by and described with reference to apparatus diagrams, system diagrams, and flowcharts that relate to uplink power modification and communication scheme change requests.

FIG. 1 illustrates an example of a wireless communications system 100 that supports uplink power modification and communication scheme change requests in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. Wireless communications system 100 may support techniques that enable a UE 115 to increase a transmit power when resources configured for autonomous uplink transmissions are unavailable, improving efficiency of uplink autonomous uplink transmissions. Additionally, a UE 115 within wireless communications system 100 may transmit a request to modify a communications scheme upon determining that the UE 115 is limited by its available transmit power, allowing a base station 105 and UE 115 to determine an efficient communication scheme to help alleviate the transmit power limitation of the UE 115.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE- Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, base station 105 may prepare a TB for transmission that includes an information component and an error detection code. The base station 105 may generate a first encoded message by cyclically shifting the TB (also referred to as circular shifting the TB) a first bit length and then encoding the shifted TB or by encoding the TB and then cyclically shifting the encoded TB by the first bit length. The base station 105 may use a cyclic code to encode the TB. The base station 105 may transmit the first encoded message during a first transmission time. The base station 105 may generate a second encoded message by cyclically (e.g., circularly) shifting the TB a second bit length and then encoding the shifted TB or by encoding the TB and then cyclically (e.g., circularly) shifting the encoded TB by the second bit length. The base station 105 may use the cyclic code to encode the TB, and the base station 105 may transmit the second encoded message during a second transmission time. The first bit length and the second bit length may be based on the first and second transmission times, respectively. Thus, the base station 105 may transmit different redundancy versions (RVs) for each synchronization signal block index (e.g., created by cyclically (e.g., circularly) shifting the codeword). A receiver, such as a UE 115, may receive the first and second encoded messages and identify a relative time distance (or difference) between the first transmission and the second transmission. The UE 115 may use the relative time distance to identify the difference between the first bit length and the second bit length. An RV sequence may indicate each cyclic shift of a TB for each repeated transmission. Each RV may indicate to start transmitting at a different part of the cyclic transport block. The number of bits transmitted by the UE may be determined based on the size of the resource allocation and the RV.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM)

techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a base station 105 may provide an autonomous uplink transmission configuration to a UE 115, which may indicate resources for an initial autonomous uplink transmission and one or more retransmissions of the initial transmission. In some cases, a UE 115 may not be guaranteed enough resources to complete the number of repetitions indicated by the repetition factor when a UE skips an uplink opportunity (e.g., TTI). In some examples, the UE may increase power for uplink transmissions and/or transmit an SR when one or more TTIs (e.g., slots or mini slots) are skipped for uplink transmission. For example, UE 115 may transmit at a higher power during the remaining TTI(s) available after a UE 115 skips the one or more TTIs than if the one or more TTIs had not been skipped. In some cases, the increase in transmit power at the UE 115 may improve the likelihood of successful delivery of the TB to a base station 105.

In some cases, a base station 105 may not be aware that a UE 115 is operating in a power limited mode and may configure the UE 115 with a communication scheme that uses a higher transmit power level than is optimal for the UE 115. A UE 115 operating with high-priority communications, for example, communications having reliability and latency requirements above a threshold level (e.g., URLLC) may benefit from using a real-time modified PHR to inform a base station more frequently about the UE's power availability or restrictions. The UE may also request new communication configurations for the UE 115 (e.g., configurations that use less power) based on the frequent power headroom measurements to improve the UE's ability to conserve power and have enough power when increased power may be needed (e.g., an increase in transmit power). In some examples, UE 115 may be configured with multiple configured grant configurations, which may include some configurations for high priority communications and some for low priority communications. The priority of a configuration may be indicated to UE 115 as part of the configuration or alternatively, based on the logical channel prioritization procedure performed by the MAC layer.

Figure 2:
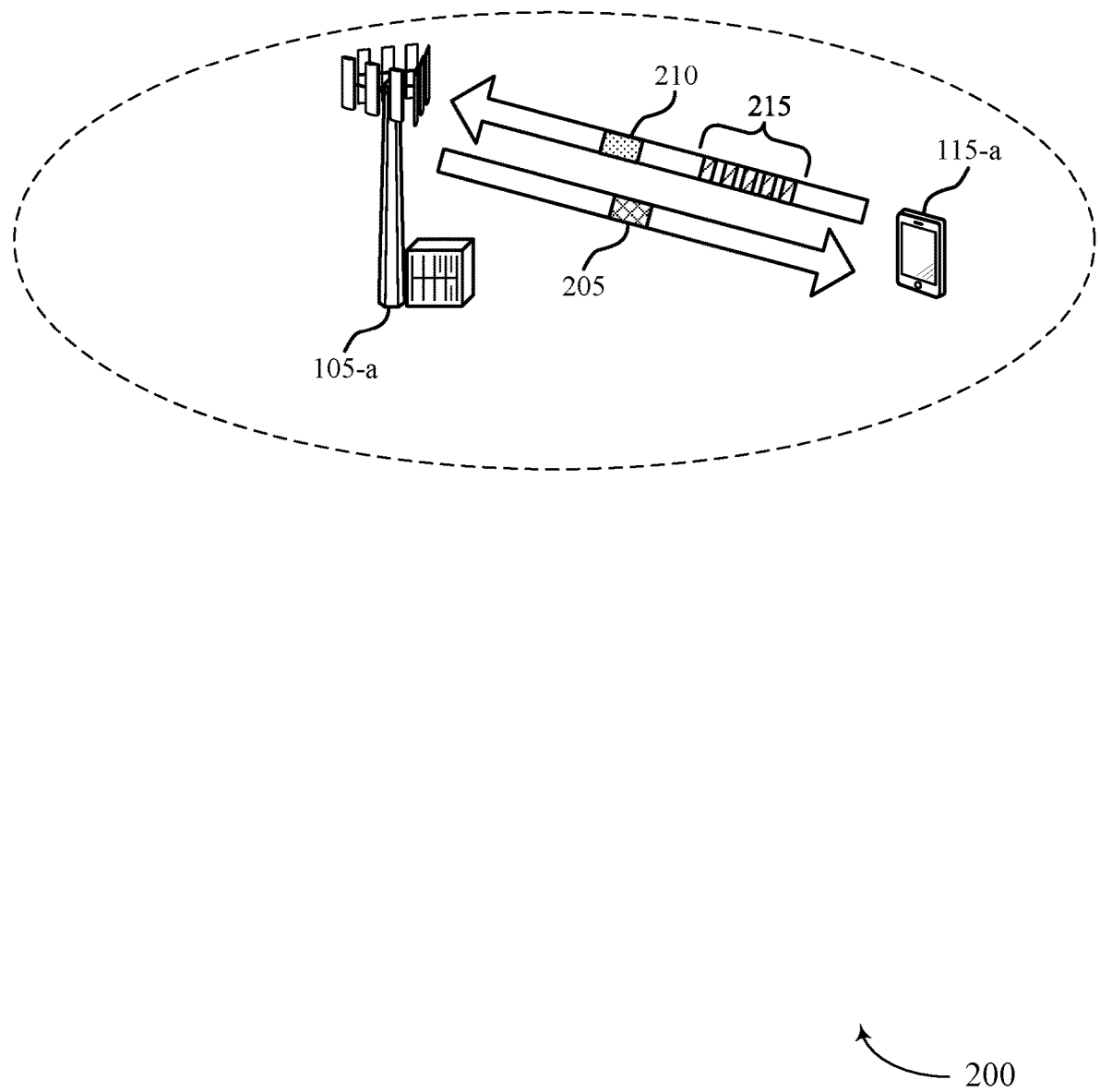
FIG. 2 illustrates an example of a wireless communications system that supports uplink power modification and communication scheme change requests in accordance with aspects of the present disclosure.

FIG. 2 illustrates an example of a wireless communications system 200 that supports uplink power modification and communication scheme change requests in accordance with aspects of the present disclosure. In some examples, wireless communications system 200 may implement aspects of wireless communications system 100. Wireless communications system 200, in this example, includes a base station 105-*a* and UE 115-*a* which may be examples of the corresponding devices described with reference to FIG. 1.

For uplink communications at UE 115-*a*, grant free—also referred to as autonomous uplink—modes may be supported by wireless communications system 200. Wireless communications system 200 may utilize autonomous uplink transmission and retransmission techniques in which base station 105-*a* may provide an autonomous uplink configuration 205 to UE 115-*a*. In some cases, the autonomous uplink configuration 205 may be provided via RRC messaging (e.g., RRC configuration and reconfiguration messages), which may be referred to as a Type 1 autonomous uplink mode. In other cases, the autonomous uplink configuration 205 may be provided via RRC messaging (e.g., RRC configuration and reconfiguration messages) and Layer 1 (L1) signaling, which may be referred to as a Type 2 autonomous uplink mode. L1 signaling may control UE 115-*a* activation and/or de-activation (or modification) of autonomous uplink transmissions.

The autonomous uplink configuration 205 may, for example, use higher layer signaling (e.g., RRC signaling) to specify a modulation and coding scheme, resource allocation, and periodicity and offset of resources allocated for autonomous uplink transmissions. In some cases, L1 signaling may signal activation or deactivation of resources for autonomous uplink transmissions. The L1 signaling may also be used to indicate a modulation and coding scheme, a resource allocation, and periodicity and offset of resources allocated for autonomous uplink transmissions.

UE 115-*a* may operate in an autonomous uplink mode when transmitting with enhanced reliability, such as UE 115-*a* using uplink repetition. Uplink repetitions may refer to the ability of UE 115-*a* to retransmit an uplink transmission multiple times on additional resources. In some examples, UE 115-*a* may be configured with a repetition window for uplink repetition. The repetition window may have a defined periodicity and/or offset. For example, a repetition window may have four TTIs for repeated uplink transmissions. It is noted that the repetition window may include any number of TTIs, and the values described herein are provided for illustrative clarity. The repetition configuration may also include an RV sequence. An initial autonomous uplink transmission may start anywhere within the repetition window that the RV is set to zero. For example, a repetition window with four TTIs may have an RV sequence of zero-three-zero-three (0 3 0 3) for the four TTIs. Thus, the UE 115-*a* may start an initial transmission at the first TTI or the third TTI because the RVs are set to zero. The UE 115-*a* may not start an initial transmission at the second TTI or the fourth TTI because the RVs are non-zero. In another example, a repetition window with four TTIs may have an RV sequence of two-one-zero-three (2 1 0 3) for the four TTIs. Thus, the UE 115-*a* may start an initial transmission at the third TTI because the RV is set to zero. Thus, the UE 115-*a* may not start an initial transmission at the first, second, or the fourth TTI because the RVs are not set to zero.

The autonomous uplink configuration 205 may indicate uplink resources that the UE 115-*a* may use for an autonomous uplink transmission 210, and a number of retransmissions 215 of the autonomous uplink transmissions (e.g., configured by a repetition factor, K). The repetition factor may indicate the number of times a transmission may be retransmitted by the UE 115-*a* and may be based on the expected number of retransmissions needed for successful reception of the data. Thus, the base station 105-*a* may configure resources for initial autonomous uplink transmission 210 and one or more autonomous uplink retransmissions 215 of the initial autonomous uplink transmission 210.

In some examples, the one or more retransmissions 215 of the initial autonomous uplink transmission 210 may not be provided enough resources to complete the configured number of repetitions (e.g., based on the repetition factor). The number of repetitions assigned to a user (e.g., UE 115-*a*) by the repetition factor may be based on an estimate of how many repetitions may be used to successfully deliver the TB with a given reliability. For example, if UE 115-*a* is configured for four repetitions, then four repetitions may be needed for successful delivery of the TB. In some cases, more or fewer repetitions may be needed by the user for a successful delivery of the TB. In some examples, the TB may not be successfully received if one or more uplink occasions are skipped (e.g., when the uplink occasions are unavailable for transmission). The uplink occasions may be skipped for various reasons, such as in cases where the RV value is not set to zero, or the resources are reserved downlink TTIs, etc. Enhancements to UE 115-*a* operation when undesirable skips occur may be valuable for allowing UE 115-*a* to successfully deliver a TB (e.g., such that the TB is successfully received/decoded at base station 105-*a*).

UE 115-*a* may increase power for uplink transmissions when operating in a repetition mode. For example, UE 115-*a* may increase transmit power for uplink transmissions when one or more TTIs (e.g., slots, mini slots, or some combination of consecutive symbol periods used for transmission) are skipped for uplink transmission. UE 115-*a* may transmit at a higher power during the remaining TTI(s) available after UE 115-*a* skips the one or more TTIs than if the one or more TTIs had not been skipped. In some cases, the increase in transmit power at the UE 115-*a* may improve the likelihood of successful delivery of the TB to base station 105-*a*.

Additionally or alternatively, UE 115-*a* may transmit an SR when operating in a repetition mode and one or more TTIs (e.g., slots or mini slots) are skipped for uplink transmission. For instance, if less than K repetitions of an autonomous uplink transmission may be sent (e.g., due to unavailable TTIs during a repetition window), then a TB transmitted by UE 115-*a* may not be received (or detected) by base station 105-*a*. As such, UE 115-*a* may transmit an SR, which may provide a more reliable channel (e.g., as compared to a PUSCH) used for the TB sent to base station 105-*a*. As a result, in cases where an uplink TB may have been otherwise missed by base station 105-*a* when fewer than a total number of repetitions of an autonomous uplink transmission are available, base station 105-*a* may detect the SR from UE 115-*a*. Base station 105-*a* may subsequently schedule a grant-based uplink transmission for UE 115-*a*.

In some examples, UE 115-*a* may be power limited when the power used by UE 115-*a* to transmit uplink data exceeds the maximum transmit power of UE 115-*a* (e.g., negative power headroom), or the current transmit power of UE 115-*a* may be at or near a maximum allowed transmit power. In some cases, the power needed by UE 115-*a* to transmit uplink data may be proportional to the total amount of data UE 115-*a* has to transmit. In some cases, base station 105-*a* may not be aware that UE 115-*a* is operating in a power limited mode. In some cases, UE 115-*a* may transmit on the physical uplink shared channel (PUSCH) at a power requested by the base station 105-*a*. When UE 115-*a* has a difference between its actual transmit power and its maximum possible transmit power, the difference may be referred to as the UE's power headroom. A power headroom may be positive or negative. UE 115-*a* may report its power headroom to base station 105-*a* using a PHR, for example, transmitted in a MAC control element. Base station 105-*a* receives the PHR and may use the PHR to inform (e.g., determine) the uplink scheduling of UE 115-*a* (e.g., the data rate of the UE's transmissions may be modified). Conventionally, UE 115-*a* may send a PHR in various situations. For instance, UE 115-*a* may send a PHR periodically based on a configuration (e.g., using a timer). Additionally or alternatively, UE 115-*a* may send a PHR if the downlink pathloss has significantly changed, for example causing the pathloss to drop below a threshold. The change in pathloss may be measured using downlink reference signals at UE 115-*a*.

In some cases, UE 115-*a* may be operating with high-priority communications, for example, communications having reliability and latency requirements above a threshold level (e.g., URLLC) and may benefit from using a real-time modified PHR to inform base station 105-*a* more frequently about the UE's power availability or restrictions. For example, the reported power headroom value could be used with cell coordination to reduce interference between UEs 115. In some cases, a power limited device (e.g., UE 115-*a*) may request a waveform change (e.g., from cyclic prefix-OFDM (CP)-OFDM to discrete Fourier transform-spread-frequency division multiplexing (DFT-s-FDM)), which may be based on or indicated in the reported power headroom. In some cases, a power limited device (e.g., UE 115-*a*) may request a modulation order change (e.g., from quadrature phase shift keying (QPSK) to pi/2-binary phase shift keying (BPSK)), which may be based on or indicated in the reported power headroom. The reported power headroom may be sent to base station 105-*a* based on different triggers (e.g., as compared to conventional PHRs). For example, one or more UEs 115 may report their power headroom instead of all UEs 115 sending their PHRs simultaneously. In one example, a single UE 115 (e.g., UE 115-*a*) may be operating in an autonomous uplink mode with a repetition window, and UE 115-*a* may increase an uplink transmit power for a number of uplink TTIs. In this example, UE 115-*a* may report that more power headroom is desired for the increased uplink transmit power. In some cases, the report may include a request for waveform change and/or a modulation order change to increase the power headroom of UE 115-*a*.

The request for updated transmission configurations from UE 115-*a* (e.g., waveform and modulation order changes) may be transmitted to base station 105-*a* using a MAC control element, configured SR resources, or dedicated resources (e.g., physical uplink control channel (PUCCH) or SR). UE 115-*a* may be capable of performing real-time PHR as explained herein. Thus, UE 115-*a* may request a change in waveform or modulation order when increased power headroom is desired, for example, when UE 115-*a* is to increase the transmit power for retransmissions 215 over a reduced number of available resources (e.g., due to skipped uplink occasions). Further, UE 115-*a* may be configured with multiple configured grant configurations, which may include some configurations for high priority communications and some for low priority communications. The priority of a configuration may be indicated to the UE 115-*a* as part of the configuration or alternatively, based on the logical channel prioritization procedure performed by the MAC layer. For instance, the priority of the configuration may depend on the logical channel from which the data is mapped to an uplink configured grant configuration.

Figure 3:
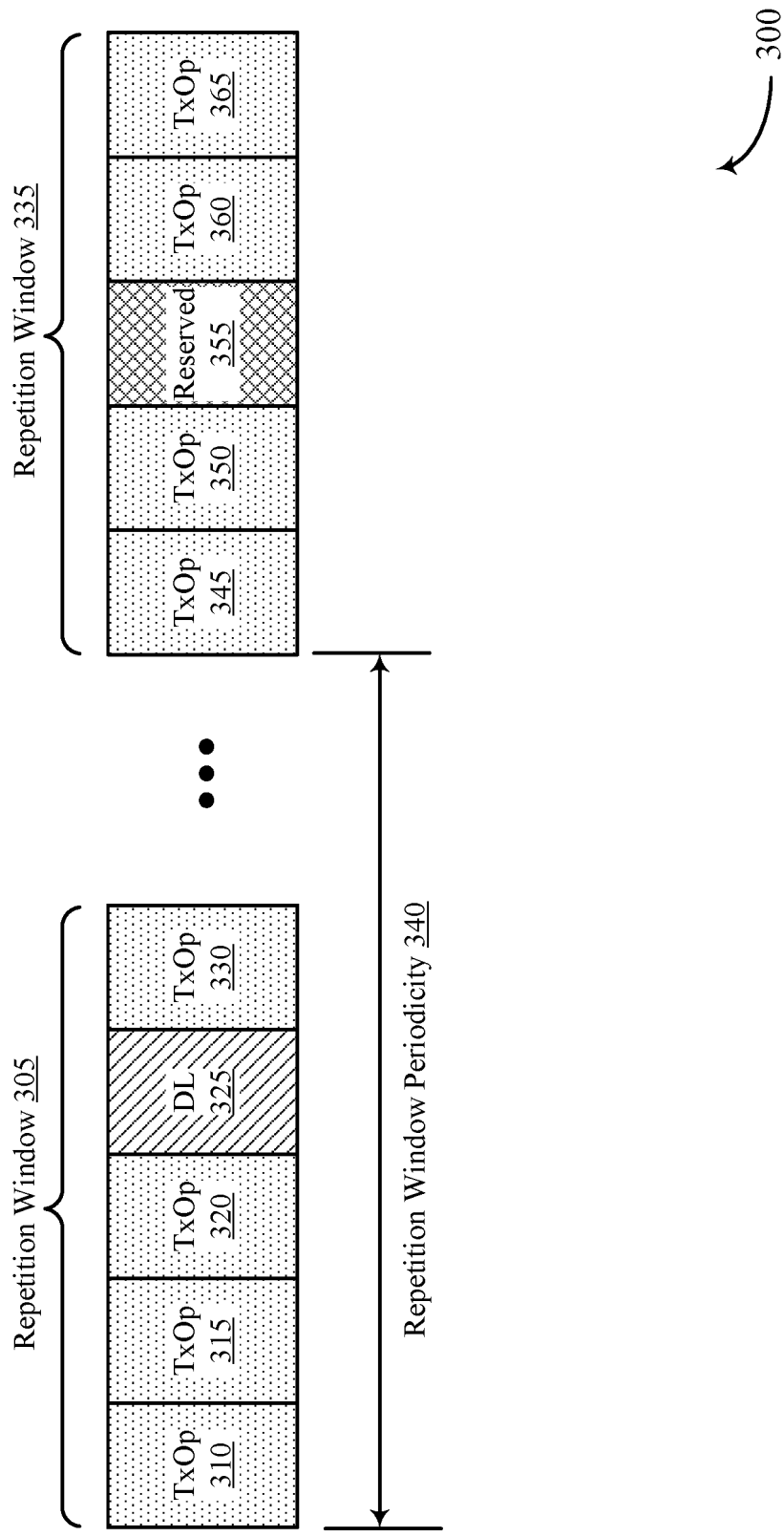
FIG. 3 illustrates an example of autonomous uplink resources that support uplink power modification and communication scheme change requests in accordance with aspects of the present disclosure.

FIG. 3 illustrates an example of autonomous uplink resources 300 that support uplink power modification and communication scheme change requests in accordance with aspects of the present disclosure. In some examples, autonomous uplink resources 300 may implement aspects of wireless communications system 100 or 200. Autonomous uplink resources 300 may include a configured repetition window 305 and 335. As described herein, repetition windows 305 and 335 may be configured for a UE 115 operating in an autonomous uplink mode with retransmission to increase reliability. The periodicity 340 of the repetition windows 305 and 335 may be signaled to a UE 115 from a base station 105 and may be indicate the length of time between the start of each repetition window. In some cases, a transmission opportunity (TxOp) may be a TTI, such as a slot, a mini-slot, a symbol period (e.g., an OFDM symbol period), multiple symbol periods, etc.

Respective TxOps within the repetition windows 305 and 335 may be configured with different RVs, and an initial autonomous uplink transmission may start anywhere within the repetition windows 305 and 335 that the RV is set to zero. In one example, repetition window 305 is configured with an RV sequence for uplink transmission opportunities 310, 315, 320, and 330. The RV sequence may be two-zero-zero-one (2 0 0 1) for TxOps 310, 315, 320, and 330 (e.g., the RVs may be two, zero, zero, and one for TxOps 310, 315, 320, and 330, respectively). Thus, an initial transmission may start at TxOp 315 or 320 (e.g., based on when data is available for transmission at the UE 115). The UE 115 configured with repetition window 305 may also be configured with a repetition factor (e.g., K) that may be used by the UE 115 operating in an autonomous uplink mode and using uplink repetition. The repetition factor may indicate the number of times a transmission may be retransmitted by the UE 115 and may be based on the expected number of retransmissions needed for successful reception of the data.

In some cases, a UE 115 may not be guaranteed enough resources to complete the number of repetitions indicated by the repetition factor. In the example shown, if K is set to three and the RV sequence of the repetition window is two-zero-zero-one (2 0 0 1) for TxOps 310, 315, 320, and 330 (e.g., the RVs may be two, zero, zero, and one for TxOps 310, 315, 320, and 330, respectively), then the UE 115 may not start the initial transmission until the second TxOp 315, and there may not be enough remaining resources in the repetition window 305 (TxOps 320, 325, and 330) to allow three repetitions.

Some TxOps (or TTIs) of repetition window 305 and/or 335 may not be available for uplink transmission. For example, in a TDD band, some TTIs may be reserved for downlink or other reserved resources. As shown, a TTI corresponding to downlink (DL) 325 may be reserved for downlink communications in repetition window 305. Similarly, a TTI corresponding to reserved resources 355 of repetition window 335 may be reserved for other types of communications or signaling, while TxOps 345, 350, 360, and 365 may be available for autonomous uplink communications. When the UE 115 skips resources that are not available for uplink transmissions (e.g., downlink resources, such as DL 325 or reserved resources 355), the UE 115 may increment the repetition counter.

The number of repetitions assigned to a user (e.g., a UE 115) by the repetition factor may be based on an estimate of how many repetitions may be needed to successfully deliver the TB within a given reliability. For example, if a user is configured for four repetitions, then four repetitions may be needed for successfully delivery of the TB. In some cases, more or fewer repetitions may be needed by the user for a successful delivery of the TB. In some examples, the TB may not be successfully received if one or more uplink occasions (e.g., TxOp 310 or DL 325) are skipped. The uplink occasions may be skipped for various reasons, such as in cases where the RV value is not set to zero or the resources are reserved downlink TTIs. Enhancements to UE operation when undesirable skips occur may be valuable for allowing a UE 115 to still successfully deliver a TB.

A UE 115 may increase power for uplink transmissions when operating in a repetition mode. For example, the UE 115 may increase power for uplink transmissions when one or more TTIs (e.g., slots or mini slots) are skipped for uplink transmission. The UE 115 may transmit at a higher power during the remaining TTI(s) available after a UE 115 skips the one or more TTIs than if the one or more TTIs had not been skipped. In some cases, the increase in transmit power at the UE 115 may improve the likelihood of successful delivery of the TB, for example, to a base station 105.

According to various aspects of the disclosure, an initial transmission may start at TxOp 315 in repetition window 305, and the UE 115 may be configured with a repetition factor of three (e.g., K=3). Thus, the UE 115 may determine that TxOp 310 and DL 325 are unavailable for retransmission and K may be incremented to five. The UE 115 may increase its uplink transmit power for TxOps 315, 320, and 330 to increase the likelihood of a successful delivery of the TB to the base station. In some cases, the UE 115 may transmit an SR in addition to or instead of increasing the transmit power. The increase in transmit power and/or SR transmission may be based on the occurrence of unavailable resources (e.g., TxOp 310 and DL 325) and that K was set to utilize more resources than the number of remaining resources in repetition window 305.

In some cases, the uplink transmit power may be increased by an amount specifically configured for the UE 115. The specific increase in transmit power at the UE 115 may be predefined or may be based on a number of factors. For example, the power increase value may be variable and based on the number of skipped uplink TTIs (e.g., two (e.g., TxOp 310 and DL 325)) or the number of available uplink TTIs (e.g., three (e.g., TxOps 310, 315, and 330)), or a combination thereof (e.g., a ratio between a number of skipped uplink TTIs and available uplink TTIs may be used when determining the value by which the transmit power may be increased). The configured increase in power may also be predefined or fixed. Thus, the power increase value may be configured for the UE 115 based on the repetition factor of the UE 115 and repetition window configuration (e.g., periodicity and/or offset). The power increase value may also be configured to be fixed at a specific value independent of the UE 115 or repetition window factors. In some cases, the UE 115 may implicitly determine the power increase value such as when the UE 115 is configured with a predefined algorithm based on the defined UE repetition configuration (e.g., repetition factor and window). In some cases, the UE 115 may explicitly receive signaling to determine the power increase value. For example, the UE 115 may receive RRC signaling from a base station 105 that indicates a power increase value, which may be specific to the UE 115. In one example, the UE 115 may determine the power increase value based on a received indication via L1 signaling. The L1 signaling may include the power increase value indication as well as the activation, deactivation, or modification of autonomous uplink transmissions at the UE 115.

Figure 4:
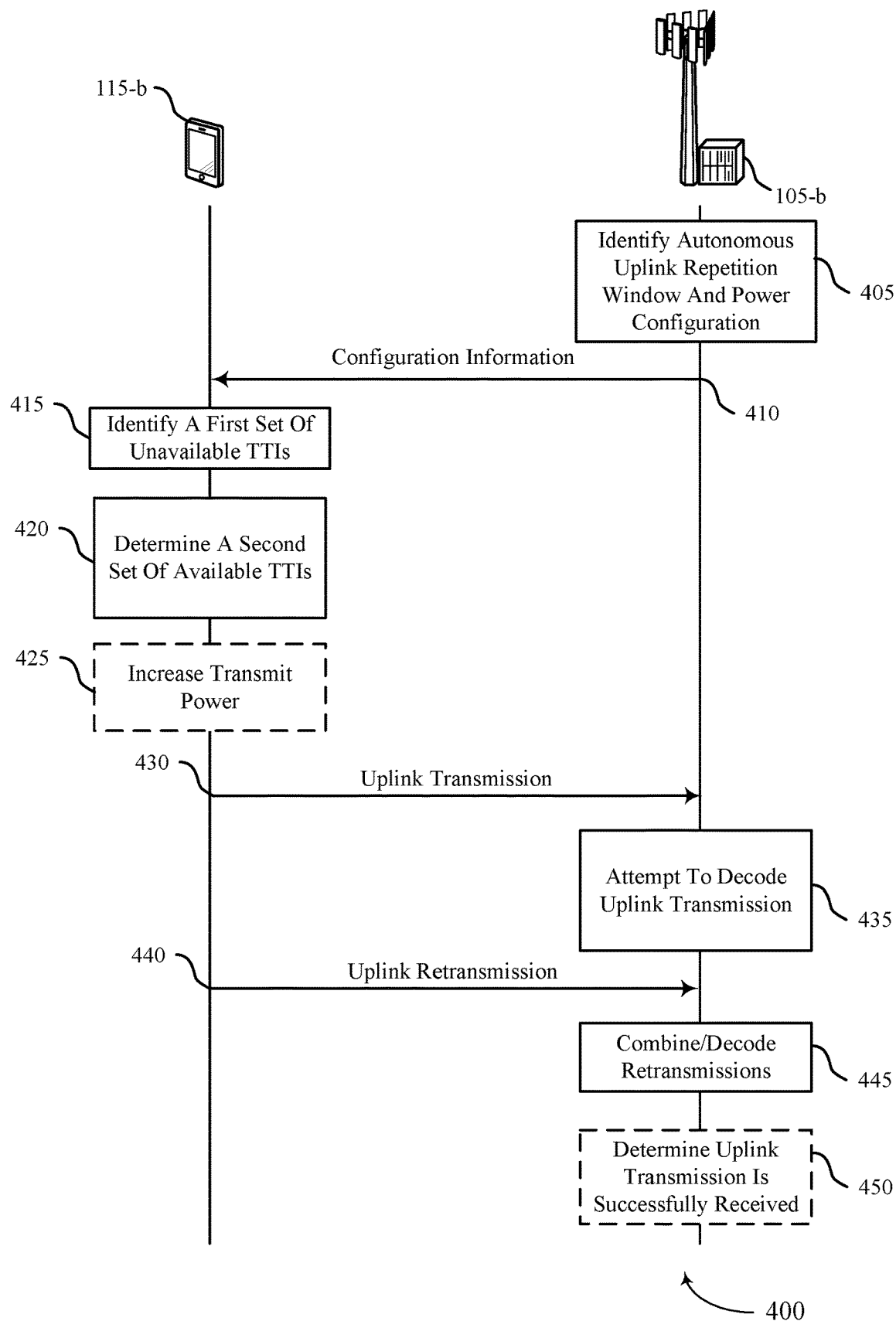
FIG. 4 illustrates an example of a process flow in a system that supports uplink power modification and communication scheme change requests in accordance with aspects of the present disclosure.

FIG. 4 illustrates an example of a process flow 400 in a system that supports uplink power modification and communication scheme change requests in accordance with aspects of the present disclosure. In some examples, process flow 400 may implement aspects of wireless communications system 100. Process flow 400 includes a UE 115-b and a base station 105-b, which may be respective examples of a UE 115 and a base station 105 as described with reference to FIGS. 1 and 2.

At 405, base station 105-b may identify a configuration for autonomous uplink operation of UE 115-b. The configuration may include the periodicity and offset of the repetition window to be used by UE 115-b. Base station 105-b may also identify a power configuration (e.g., fixed or variable) for UE 115-b. In some examples, the repetition window configuration and the power configuration may be transmitted together. In other cases, the repetition window configuration and the power configuration may be transmitted separately. At 410, base station 105-b may transmit the identified configuration information to UE 115-b. In some cases, the transmission 410 may use RRC signaling and/or L1 signaling. In some examples, UE 115-b may receive multiple configured grant configurations at 410, which may include some configurations for high priority communications and some for low priority communications. The priority of a configuration may be indicated to UE 115-b as part of the configuration or alternatively, based on the logical channel prioritization procedure performed by the MAC layer. For instance, the priority of the configuration may depend on the logical channel from which the data is mapped to an uplink configured grant configuration.

At 415, UE 115-b may identify a first set of unavailable TTIs. For example, TTIs may be unavailable for initial transmissions based on the respective RV values of the TTIs, or TTIs may be unavailable for uplink transmissions due to the TTI(s) being reserved for other communications (e.g., downlink). At 420, UE 115-b may determine a second set of available TTIs based on identifying the unavailable TTIs identified at 415. The TTIs may be available for initial transmissions and/or retransmissions from UE 115-b to base station 105-b.

Optionally at 425, UE 115-b may increase the power for uplink transmissions based on there being unavailable TTIs identified. In some cases, the uplink transmit power may be increased by an amount specifically configured for the UE 115-b. The specific increase in transmit power at the UE 115-b may be predefined or may be based on a number of factors. For example, the power increase value may be variable and based on the number of unavailable uplink TTIs or the number of available uplink TTIs (e.g., identified at 415 and 420). The configured increase in power may also be predefined or fixed. Thus, the power increase value may be configured for the UE 115-b based on the UE's repetition factor and window configuration (e.g., periodicity and/or offset). The power increase value may also be configured to be fixed at a specific value independent of UE 115-b factors. This predefined or fixed power increase may have been indicated in the configuration information transmitted from base station 105-b at 410.

In some cases, UE 115-b may implicitly determine the power increase value such as when the UE is configured with a predefined algorithm (e.g., received in configuration information transmitted from base station 105-b at 410) based on the defined UE 115-b repetition configuration (e.g., repetition factor and window). In some cases, UE 115-b may explicitly receive signaling to determine the power increase value (e.g., received in configuration information transmitted from base station 105-b at 410). For example, the UE 115-b may receive RRC signaling from base station 105-b that indicates a power increase value, which may be specific to the UE 115-b. In one example, UE 115-b may determine the power increase value based on a received indication via L1 signaling. The L1 signaling may include the power increase value indication as well as the activation, deactivation, or modification of autonomous uplink transmissions at UE 115-*b*.

At 430, UE 115-*b* may transmit an initial uplink transmission to base station 105-*b* using increased power. The initial uplink transmission may optionally include an SR based on identifying the first subset of TTIs that is unavailable. In such cases, base station 105-*b* may detect the transmitted SR based on the TTIs unavailable to UE 115-*b*, and may configure a set of uplink resources utilized by UE 115-*b* for transmitting data. Accordingly, UE 115-*b* may receive a resource grant for the set of uplink resources from base station 105-*b*.

At 435, base station 105-*b* may attempt to decode the uplink transmission received from UE 115-*b* at 430. At 440, UE 115-*b* may transmit uplink retransmission to base station 105-*b* using increased power. The retransmissions (e.g., the number of retransmissions) may be less than the configured repetition factor, K, when some TTIs are unavailable. The increased power for uplink retransmission may be the same or different than the power used for the initial uplink transmission.

At 445, base station 105-*b* may attempt to decode the transmission. In some cases, base station 105-*b* may combine each retransmission with the initial transmission (e.g., using soft combining techniques) and attempt to decode the uplink transmission. Optionally at 450, base station 105-*b* may determine that the uplink TB transmission is successfully received. Such a determination may be made based on successfully decoding the uplink transmission and obtaining the uplink data therefrom.

Figure 5:
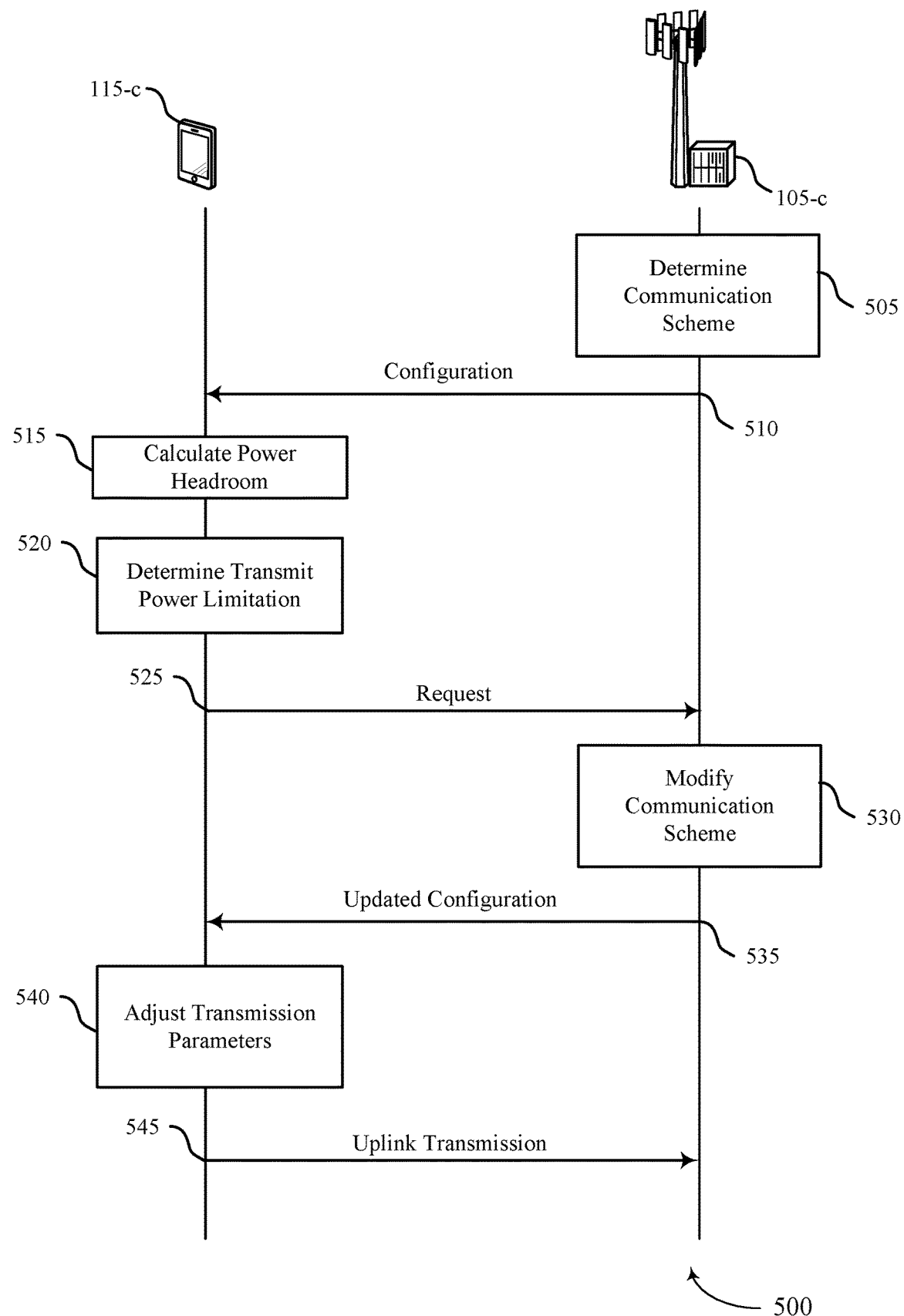
FIG. 5 illustrates an example of a process flow in a system that supports uplink power modification and communication scheme change requests in accordance with aspects of the present disclosure.

FIG. 5 illustrates an example of a process flow 500 in a system that supports uplink power modification and communication scheme change requests in accordance with aspects of the present disclosure. In some examples, process flow 500 may implement aspects of wireless communications system 100. Process flow 500 includes a UE 115-*c* and a base station 105-*c*, which may be respective examples of a UE 115 and a base station 105 as described with reference to FIGS. 1 and 2.

At 505, base station 105-*c* may determine a communication scheme for UE 115-*c*. The communication scheme may include the waveform and modulation order to be used for communications between base station 105-*c* and UE 115-*c*. This determination at base station 105-*c* may be made, for example, without power limitation information of UE 115-*c*. At 510, base station 105-*c* may transmit the determined communication scheme configuration to UE 115-*c*.

At 515, UE 115-*c* may calculate its power headroom based on the received configuration. At 520, UE 115-*c* may determine the transmit power limitation for uplink transmissions based on the configured communication schemes. In some cases, if the UE 115-*c* is operating in an autonomous uplink mode with retransmissions, then higher transmit powers may be desired as described herein.

At 525, UE 115-*c* may transmit a request for an updated communication scheme (e.g., a new waveform or modulation scheme). The request may be based on the calculated power headroom and/or power limitation. UE 115-*c* may update base station 105-*c* with power headroom and limitation reports in real-time or more frequently than conventional PHRs as previously described. The request from UE 115-*c* for an updated communication scheme configuration (e.g., waveform and modulation order changes) may be transmitted to base station 105-*c* using a MAC control element, configured SR resources, or dedicated resources (e.g., PUCCH or SR).

At 530, base station 105-*c* may modify the communication scheme for UE 115-*c* based on the received request. In some cases, this may include a waveform change (e.g., from CP-OFDM to DFT-S-FDM) and/or a modulation order change (e.g., from QPSK to pi/2-bpsk). At 535, base station 105-*c* may transmit the updated communication scheme configuration to UE 115-*c*.

At 540, UE 115-*c* may update its transmission parameters based on the received updated communication scheme configuration. UE 115-*c* may also recalculate its power headroom to ensure there is enough power for increasing transmit power for retransmissions.

At 545, UE 115-*c* may transmit an uplink TB using the adjusted transmission parameters, which may include one or more of a new waveform, a new modulation order, and a transmit power increase.

Figure 6:
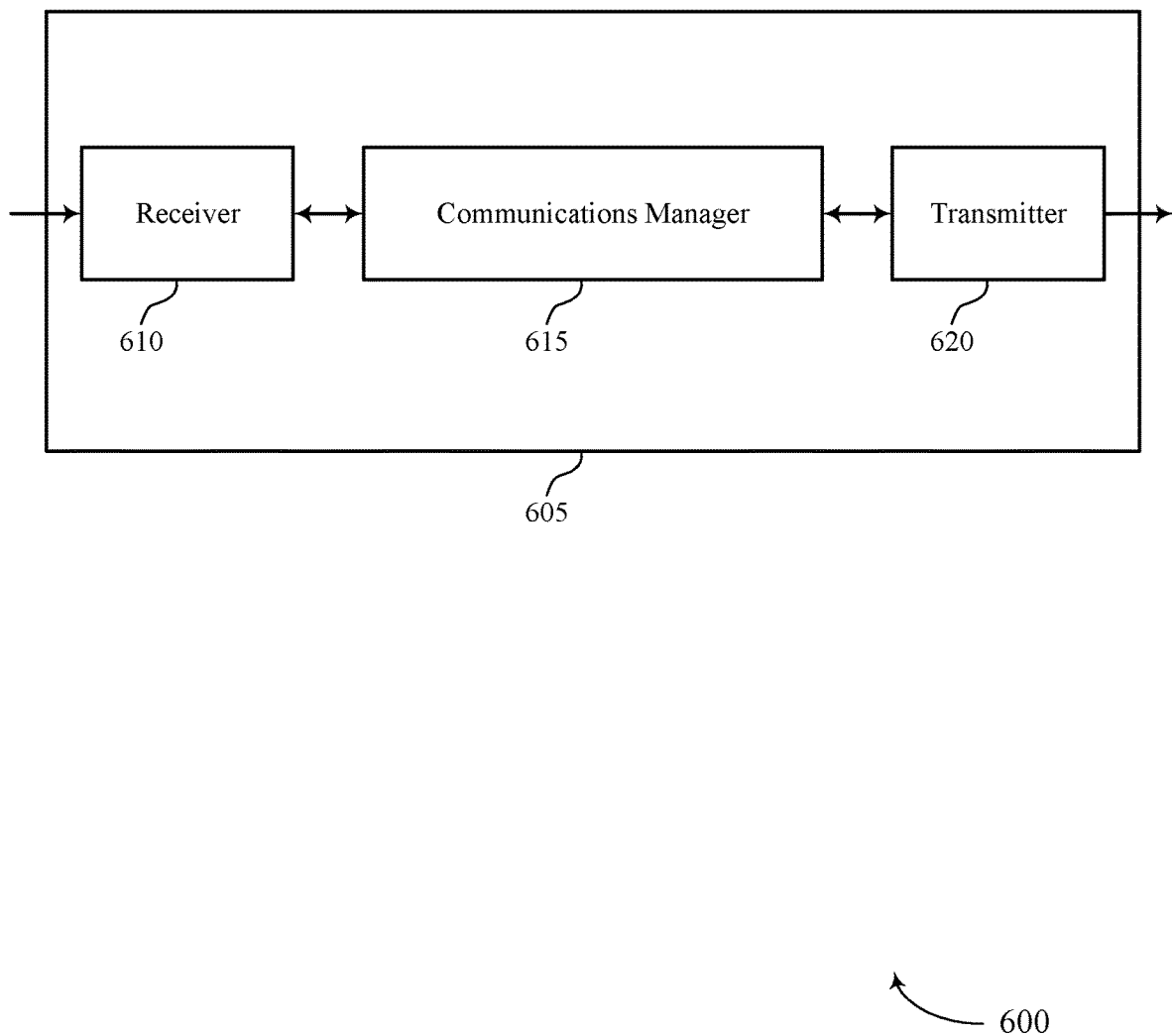
FIGS. 6 and 7 show block diagrams of devices that support uplink power modification and communication scheme change requests in accordance with aspects of the present disclosure.

FIG. 6 shows a block diagram 600 of a device 605 that supports uplink power modification and communication scheme change requests in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to uplink power modification and communication scheme change requests, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a configuration for a repetition window including a set of TTIs, the repetition window configured for sending a set of instances of an autonomous uplink transmission using the set of TTIs, identify, from the set of TTIs, a first subset of TTIs that is unavailable for sending the set of instances of the autonomous uplink transmission, determine a second subset of TTIs from the set of TTIs that is available for sending the set of instances of the autonomous uplink transmission, and transmit, based at least in part on identifying the first subset of TTIs that is unavailable, instances of the autonomous uplink transmission using the second subset of TTIs with an increased transmit power, or a scheduling request (SR), or a combination thereof. The communications manager 615 may also calculate a difference between a maximum transmit power and a transmit power to be used for transmitting uplink data to a base station on one or more carriers of a cell, where the cell is configured for high-priority communications (e.g., communications having a higher priority than other communications), determine a transmit power limitation based on the calculated difference, and transmit a request to modify a communication scheme used for communicating with the base station, the request based on the determined transmit power limitation.

The communications manager 615 as described herein may be implemented to realize one or more potential advantages. One implementation may allow the device 605 to provide techniques which may support uplink power modification and communication scheme change requests, among other advantages. For example, the device 605 may include features for increasing system reliability (e.g., reliability of TBs transmitted to a base station), as the device 605 may increase uplink transmit power (e.g., in cases of a reduced number of uplink retransmission opportunities). Additionally or alternatively, the device 605 may include features for conserving power, as the device 605 may modify a communication scheme (e.g., a waveform change, a modulation order change, transmit power increase) between the device 605 and another device (e.g., a base station) based on power limitations of the device 605 (e.g., power headroom, available transmit power). The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
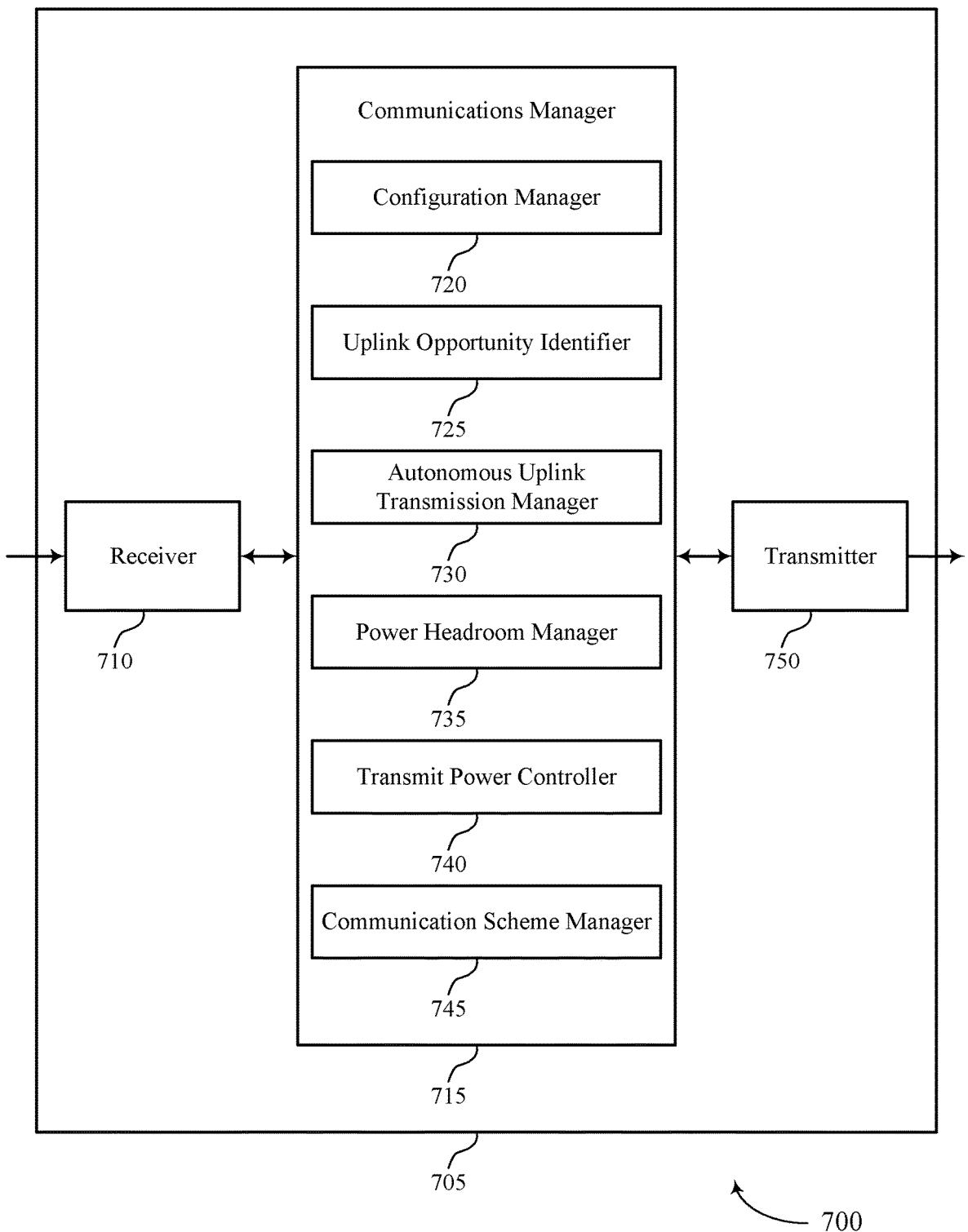

FIG. 7 shows a block diagram 700 of a device 705 that supports uplink power modification and communication scheme change requests in accordance with aspects of the present disclosure. The device 705 may be an example of aspects of a device 605 or a UE 115 as described herein. The device 705 may include a receiver 710, a communications manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information related to uplink power modification and communication scheme change requests, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a configuration manager 720, an uplink opportunity identifier 725, an autonomous uplink transmission manager 730, a power headroom manager 735, a transmit power controller 740, and a communication scheme manager 745. The communications manager 715 may be an example of aspects of the communications manager 910 described herein.

The configuration manager 720 may receive a configuration for a repetition window including a set of TTIs, the repetition window configured for sending a set of instances of an autonomous uplink transmission using the set of TTIs.

The uplink opportunity identifier 725 may identify, from the set of TTIs, a first subset of TTIs that is unavailable for sending the set of instances of the autonomous uplink transmission and determine a second subset of TTIs from the set of TTIs that is available for sending the set of instances of the autonomous uplink transmission.

The autonomous uplink transmission manager 730 may transmit, based at least in part on identifying the first subset of TTIs that is unavailable, instances of the autonomous uplink transmission using the second subset of TTIs with an increased transmit power, or a scheduling request (SR), or a combination thereof.

The power headroom manager 735 may calculate a difference between a maximum transmit power and a transmit power to be used for transmitting uplink data to a base station on one or more carriers of a cell, where the cell is configured for high-priority communications (e.g., URLLC).

The transmit power controller 740 may determine a transmit power limitation based on the calculated difference. The communication scheme manager 745 may transmit a request to modify a communication scheme used for communicating with the base station, the request based on the determined transmit power limitation.

The transmitter 750 may transmit signals generated by other components of the device 705. In some examples, the transmitter 750 may be collocated with a receiver 710 in a transceiver module. For example, the transmitter 750 may be an example of aspects of the transceiver 920 described with reference to FIG. 9. The transmitter 750 may utilize a single antenna or a set of antennas.

Figure 8:
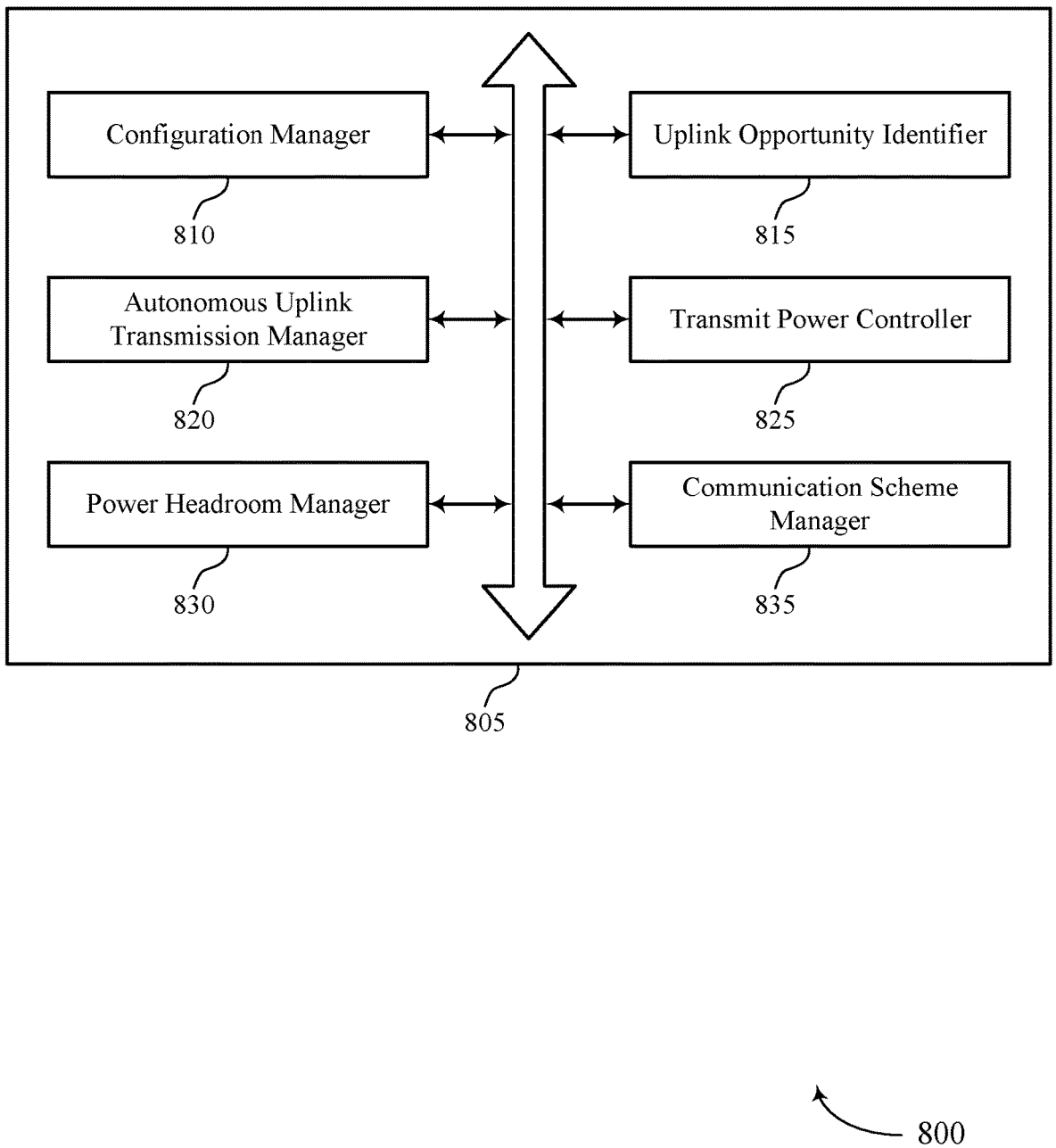
FIG. 8 shows a block diagram of a communications manager that supports uplink power modification and communication scheme change requests in accordance with aspects of the present disclosure.

FIG. 8 shows a block diagram 800 of a communications manager 805 that supports uplink power modification and communication scheme change requests in accordance with aspects of the present disclosure. The communications manager 805 may be an example of aspects of a communications manager 615, a communications manager 715, or a communications manager 910 described herein. The communications manager 805 may include a configuration manager 810, an uplink opportunity identifier 815, an autonomous uplink transmission manager 820, a transmit power controller 825, a power headroom manager 830, and a communication scheme manager 835. Each of these modules may communicate, directly or indirectly, with one another (e.g., via one or more buses).

The configuration manager 810 may receive a configuration for a repetition window including a set of TTIs, the repetition window configured for sending a set of instances of an autonomous uplink transmission using the set of TTIs.

The uplink opportunity identifier 815 may identify, from the set of TTIs, a first subset of TTIs that is unavailable for sending the set of instances of the autonomous uplink transmission. In some examples, the uplink opportunity identifier 815 may determine a second subset of TTIs from the set of TTIs that is available for sending the set of instances of the autonomous uplink transmission. In some cases, the first subset of TTIs that is unavailable includes TTIs configured for downlink transmissions, TTIs having reserved resources, or a combination thereof. In some cases, the set of TTIs includes a set of respective slots, mini-slots, symbol periods, or a combination thereof.

The autonomous uplink transmission manager 820 may transmit, based at least in part on identifying the first subset of TTIs that is unavailable, instances of the autonomous uplink transmission using the second subset of TTIs with an increased transmit power, or an SR, or a combination thereof. In some cases, the autonomous uplink transmission manager 820 may receive a resource grant for a set of uplink resources in response to transmitting the SR. In some cases, the autonomous uplink transmission manager 820 may transmit data on the set of uplink resources based at least in part on the first subset of TTIs that is unavailable.

The transmit power controller 825 may determine a transmit power limitation based on the calculated difference. In some examples, the transmit power controller 825 may receive, from a base station, an indication of a UE-specific power value, where the transmit power is increased by the UE-specific power value. In some examples, the transmit power controller 825 may determine a power value based on a number of TTIs in the first subset of TTIs that is unavailable, where the transmit power is increased by the determined power value.

In some examples, the transmit power controller 825 may determine a power value based on a ratio between a first number of TTIs in the first subset of TTIs and a second number of TTIs in the second subset of TTIs, where the transmit power is increased by the determined power value. In some examples, the transmit power controller 825 may determine a preconfigured power value based on a presence of the first subset of TTIs that is unavailable, where the transmit power is increased by the preconfigured power value. In some cases, the configuration is received via RRC signaling. In some cases, the configuration is received via signaling that activates or modifies autonomous uplink transmissions at the UE 115.

The power headroom manager 830 may calculate a difference between a maximum transmit power and a transmit power to be used for transmitting uplink data to a base station on one or more carriers of a cell, where the cell is configured for high-priority communications (e.g., communications having reliability and latency requirements above a threshold level).

The communication scheme manager 835 may transmit a request to modify a communication scheme used for communicating with the base station, the request based on the determined transmit power limitation. In some examples, the communication scheme manager 835 may transmit the request via a MAC CE, SR resources, a set of configured resources, or a combination thereof.

In some examples, the communication scheme manager 835 may determine that the difference between the maximum transmit power and the transmit power to be used for transmitting uplink data satisfies a threshold, where the request to modify the communication scheme is transmitted based on the difference satisfying the threshold.

In some examples, the communication scheme manager 835 may determine that path loss for one or more downlink reference signals in the cell satisfies a path loss threshold, where transmitting the request to modify the communication scheme is based on the path loss satisfying the path loss threshold. In some cases, the request to modify the communication scheme includes a request for a waveform change, a request for a modulation order change, or a combination thereof.

Figure 9:
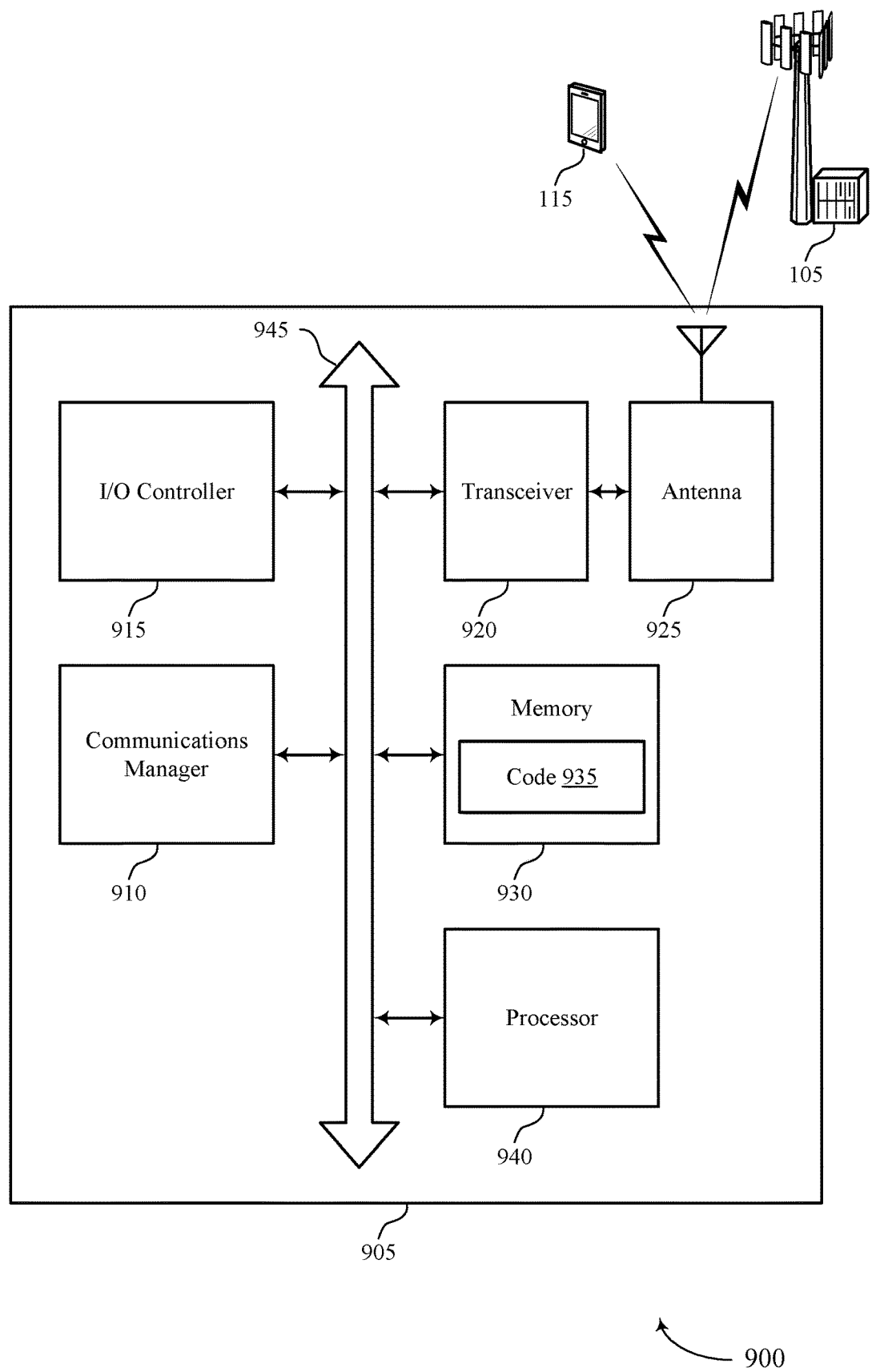
FIG. 9 shows a diagram of a system including a device that supports uplink power modification and communication scheme change requests in accordance with aspects of the present disclosure.

FIG. 9 shows a diagram of a system 900 including a device 905 that supports uplink power modification and communication scheme change requests in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a configuration for a repetition window including a set of TTIs, the repetition window configured for sending a set of instances of an autonomous uplink transmission using the set of TTIs, identify, from the set of TTIs, a first subset of TTIs that is unavailable for sending the set of instances of the autonomous uplink transmission, determine a second subset of TTIs from the set of TTIs that is available for sending the set of instances of the autonomous uplink transmission, and transmit, based at least in part on identifying the first subset of TTIs that is unavailable, instances of the autonomous uplink transmission using the second subset of TTIs with an increased transmit power, or a scheduling request (SR), or a combination thereof. The communications manager 910 may also calculate a difference between a maximum transmit power and a transmit power to be used for transmitting uplink data to a base station on one or more carriers of a cell, where the cell is configured for high-priority communications (e.g., communications having reliability and latency requirements above a threshold level), determine a transmit power limitation based on the calculated difference, and transmit a request to modify a communication scheme used for communicating with the base station, the request based on the determined transmit power limitation.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting uplink power modification and communication scheme change requests).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
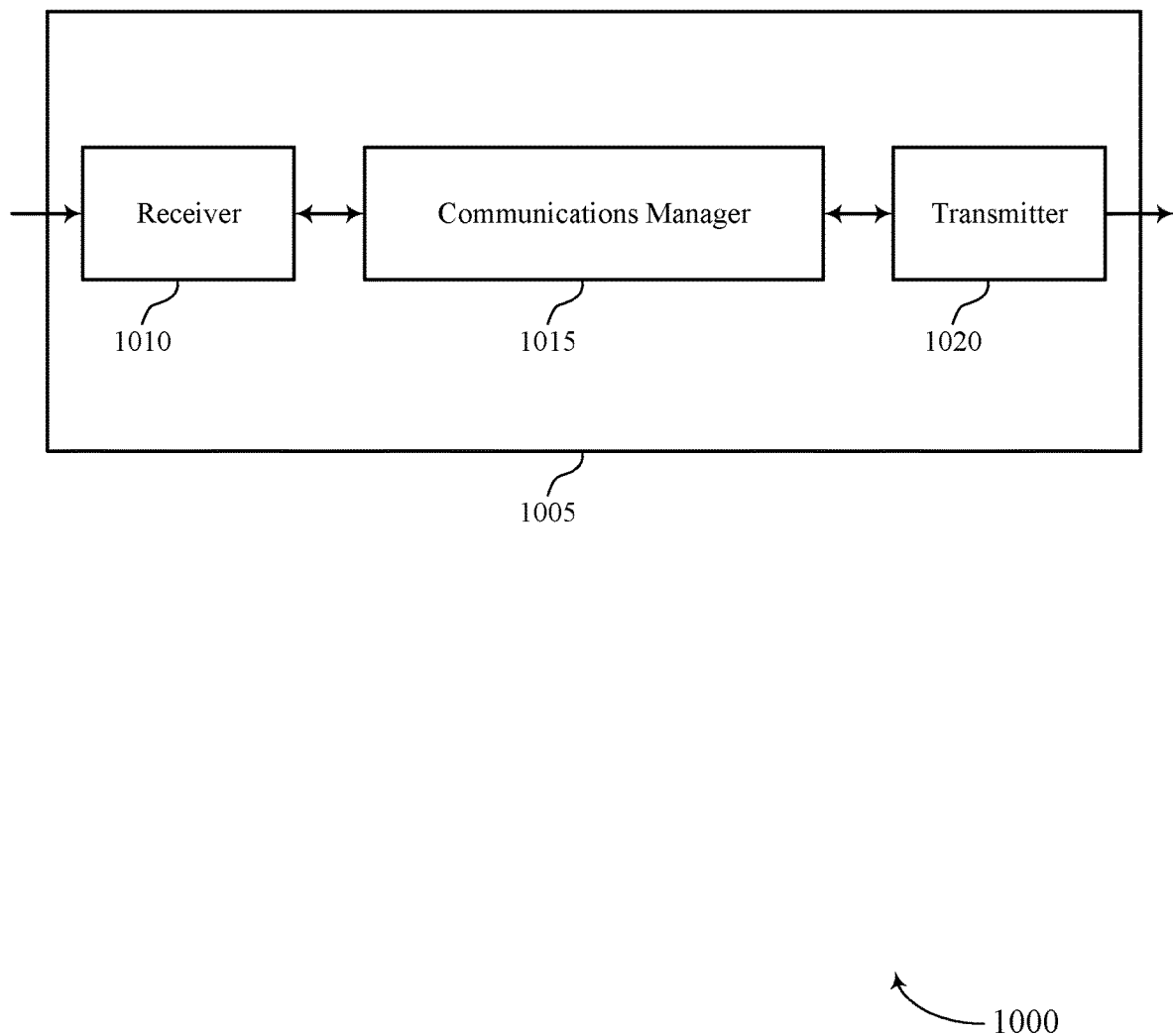
FIGS. 10 and 11 show block diagrams of devices that support uplink power modification and communication scheme change requests in accordance with aspects of the present disclosure.

FIG. 10 shows a block diagram 1000 of a device 1005 that supports uplink power modification and communication scheme change requests in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink power modification and communication scheme change requests, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE 115, a configuration of periodic repetition windows including a set of TTIs, each repetition window being configured for receiving a set of instances of an autonomous uplink transmission using the set of TTIs and receive, during a repetition window, instances of the autonomous uplink transmission having a transmit power increased by a power value, where the increased transmit power is based on a subset of TTIs from the set of TTIs being unavailable for receiving the instances of the autonomous uplink transmission. The communications manager 1015 may also receive, from a UE 115, a request to modify a communication scheme used for communicating with the base station on one or more carriers of a cell, the request based on a power limitation of the UE 115, where the cell is configured for high-priority communications (e.g., communications having reliability and latency requirements above a threshold level) and modify the communication scheme based on the received request, where modifying the communication scheme includes modifying a waveform, modifying a modulation order, or a combination thereof.

The communications manager 1015 as described herein may be implemented to realize one or more potential advantages. One implementation may allow the device 1005 to provide techniques which may support uplink power modification and communication scheme change requests, among other advantages. For example, the device 1005 may include features for increasing system reliability (e.g., reliability of TBs received from a UE 115), as the device 1005 may provide the UE 115 an indication of a power value to increase transmit power of the UE 115 (e.g., increase uplink transmit power, for example, in cases of a reduced number of uplink retransmission opportunities). Additionally or alternatively, the device 1005 includes features which may allow the UE 115 to conserve power, as the device 1005 may provide modifications for a communication scheme (e.g., a waveform change, a modulation order change, transmit power increase) implemented by the UE 115 based on power limitations of the UE 115 (e.g., power headroom, available transmit power). The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
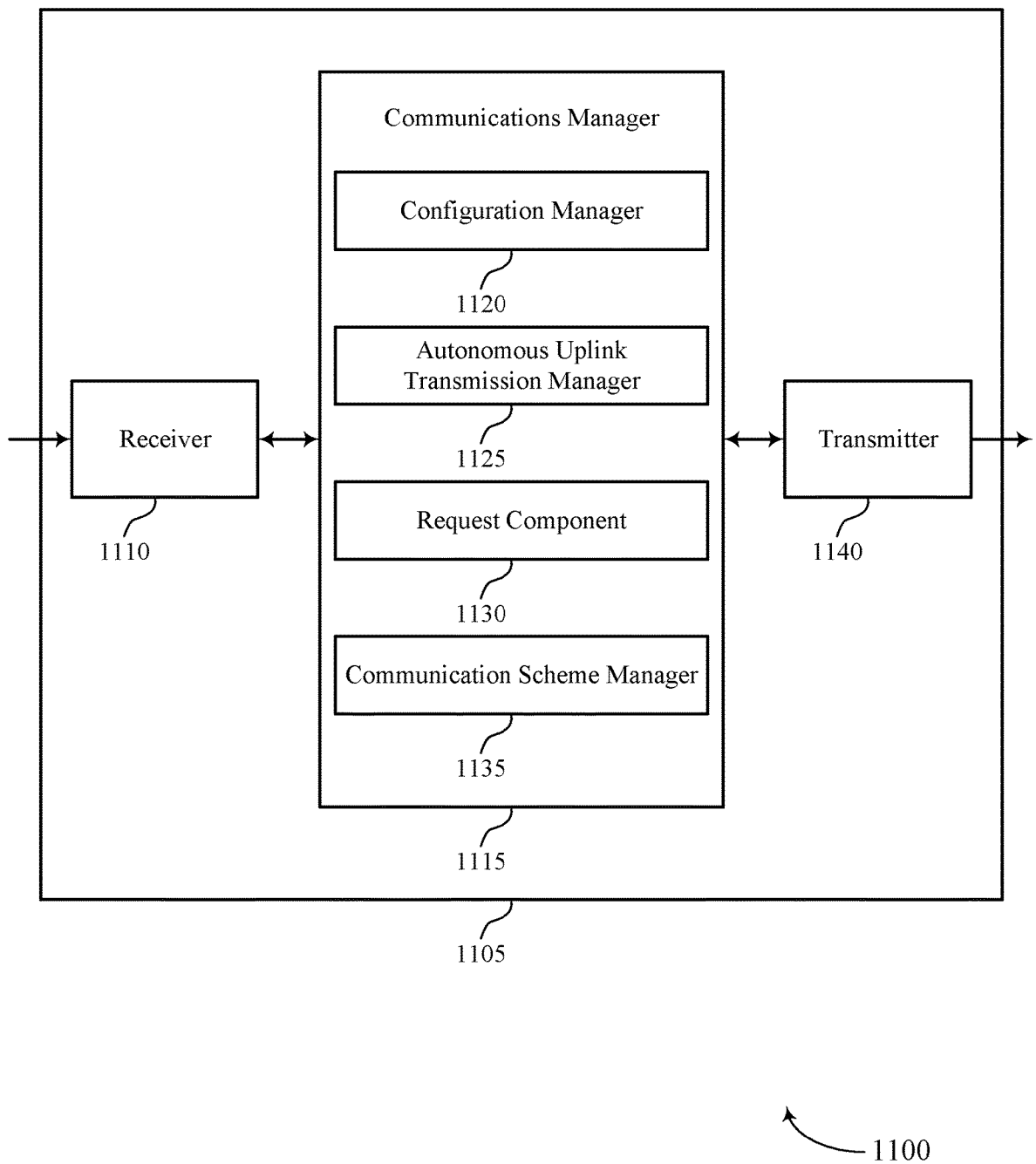

FIG. 11 shows a block diagram 1100 of a device 1105 that supports uplink power modification and communication scheme change requests in accordance with aspects of the present disclosure. The device 1105 may be an example of aspects of a device 1005 or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to uplink power modification and communication scheme change requests, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration manager 1120, an autonomous uplink transmission manager 1125, a request component 1130, and a communication scheme manager 1135. The communications manager 1115 may be an example of aspects of the communications manager 1310 described herein.

The configuration manager 1120 may transmit, to a UE 115, a configuration of periodic repetition windows including a set of TTIs, each repetition window being configured for receiving a set of instances of an autonomous uplink transmission using the set of TTIs.

The autonomous uplink transmission manager 1125 may receive, during a repetition window, instances of the autonomous uplink transmission having a transmit power increased by a power value, or an SR, or a combination thereof based on a subset of TTIs from the set of TTIs being unavailable for receiving the instances of the autonomous uplink transmission. In some cases, the autonomous uplink transmission manager 1125 may configure a set of uplink resources in response to receiving the SR and transmit a resource grant indicating the set of uplink resources.

The request component 1130 may receive, from a UE 115, a request to modify a communication scheme used for communicating with the base station on one or more carriers of a cell, the request based on a power limitation of the UE 115, where the cell is configured for high-priority communications (e.g., communications having reliability and latency requirements above a threshold level).

The communication scheme manager 1135 may modify the communication scheme based on the received request, where modifying the communication scheme includes modifying a waveform, modifying a modulation order, or a combination thereof.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
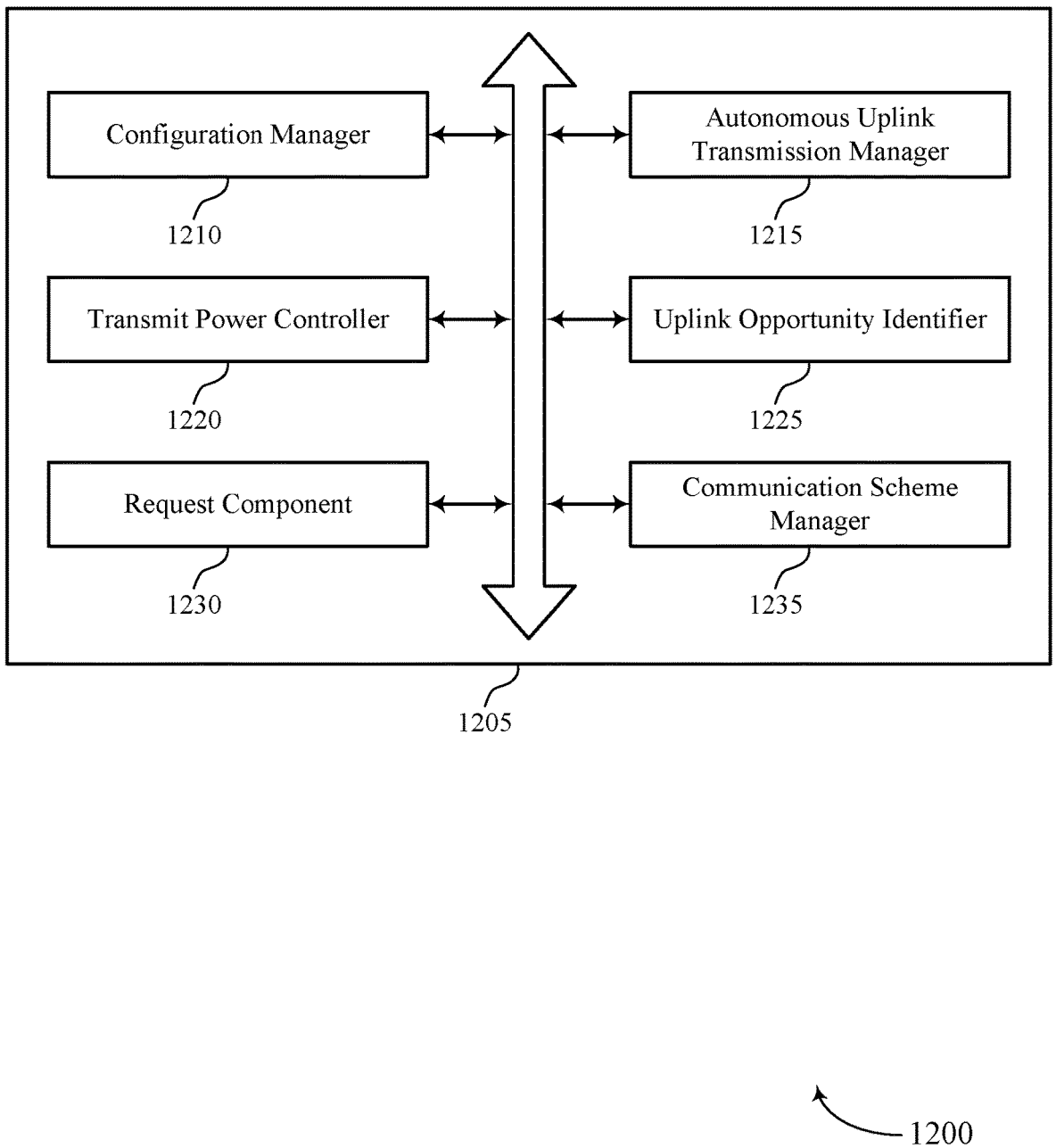
FIG. 12 shows a block diagram of a communications manager that supports uplink power modification and communication scheme change requests in accordance with aspects of the present disclosure.

FIG. 12 shows a block diagram 1200 of a communications manager 1205 that supports uplink power modification and communication scheme change requests in accordance with aspects of the present disclosure. The communications manager 1205 may be an example of aspects of a communications manager 1015, a communications manager 1115, or a communications manager 1310 described herein. The communications manager 1205 may include a configuration manager 1210, an autonomous uplink transmission manager 1215, a transmit power controller 1220, an uplink opportunity identifier 1225, a request component 1230, and a communication scheme manager 1235. Each of these modules may communicate, directly or indirectly, with one another (e.g., via one or more buses).

The configuration manager 1210 may transmit, to a UE 115, a configuration of periodic repetition windows including a set of TTIs, each repetition window being configured for receiving a set of instances of an autonomous uplink transmission using the set of TTIs.

The autonomous uplink transmission manager 1215 may receive, during a repetition window, instances of the autonomous uplink transmission having a transmit power increased by a power value, where the increased transmit power is based on a subset of TTIs from the set of TTIs being unavailable for receiving the instances of the autonomous uplink transmission.

The request component 1230 may receive, from a UE 115, a request to modify a communication scheme used for communicating with the base station on one or more carriers of a cell, the request based on a power limitation of the UE 115, where the cell is configured for high-priority communications (e.g., communications having reliability and latency requirements above a threshold level).

In some examples, the request component 1230 may receive the request via a MAC CE, SR resources, a set of configured resources, or a combination thereof. The communication scheme manager 1235 may modify the communication scheme based on the received request, where modifying the communication scheme includes modifying a waveform, modifying a modulation order, or a combination thereof. In some examples, the communication scheme manager 1235 may modify the communication scheme based on coordinating interference reduction with one or more neighboring cells.

In some examples, the communication scheme manager 1235 may transmit, to the UE 115, an indication of a set of configured resources for sending the request to modify the communication scheme, where the request is received on the set of configured resources.

The transmit power controller 1220 may transmit, to the UE 115, an indication of the power value to increase the transmit power, where the power value includes a power value that is specific to the UE 115. In some examples, the transmit power controller 1220 may determine a preconfigured power value to increase the transmit power based on a presence of the subset of TTIs that is unavailable, where the transmit power is increased by the preconfigured power value. In some cases, the indication is transmitted via RRC signaling. In some cases, the indication is transmitted via signaling that activates or modifies autonomous uplink transmissions at the UE 115.

The uplink opportunity identifier 1225 may identify, from the set of TTIs, a first subset of TTIs that is unavailable for sending the set of instances of the autonomous uplink transmission and determine a second subset of TTIs from the set of TTIs that is available for sending the set of instances of the autonomous uplink transmission. In some cases, the first subset of TTIs that is unavailable includes TTIs configured for downlink transmissions, TTIs having reserved resources, or a combination thereof. In some cases, the set of TTIs includes a set of respective slots, mini-slots, symbol periods, or a combination thereof.

In some cases, the power value may be based on a number of TTIs in the subset of TTIs. In some cases, the power value may be based on a ratio between a first number of TTIs in the subset of TTIs and a second number of TTIs in a second subset of TTIs that is available for receiving the instances of the autonomous uplink transmission. In some cases, the subset of TTIs may include TTIs configured for downlink transmissions, TTIs having reserved resources, or a combination thereof.

Figure 13:
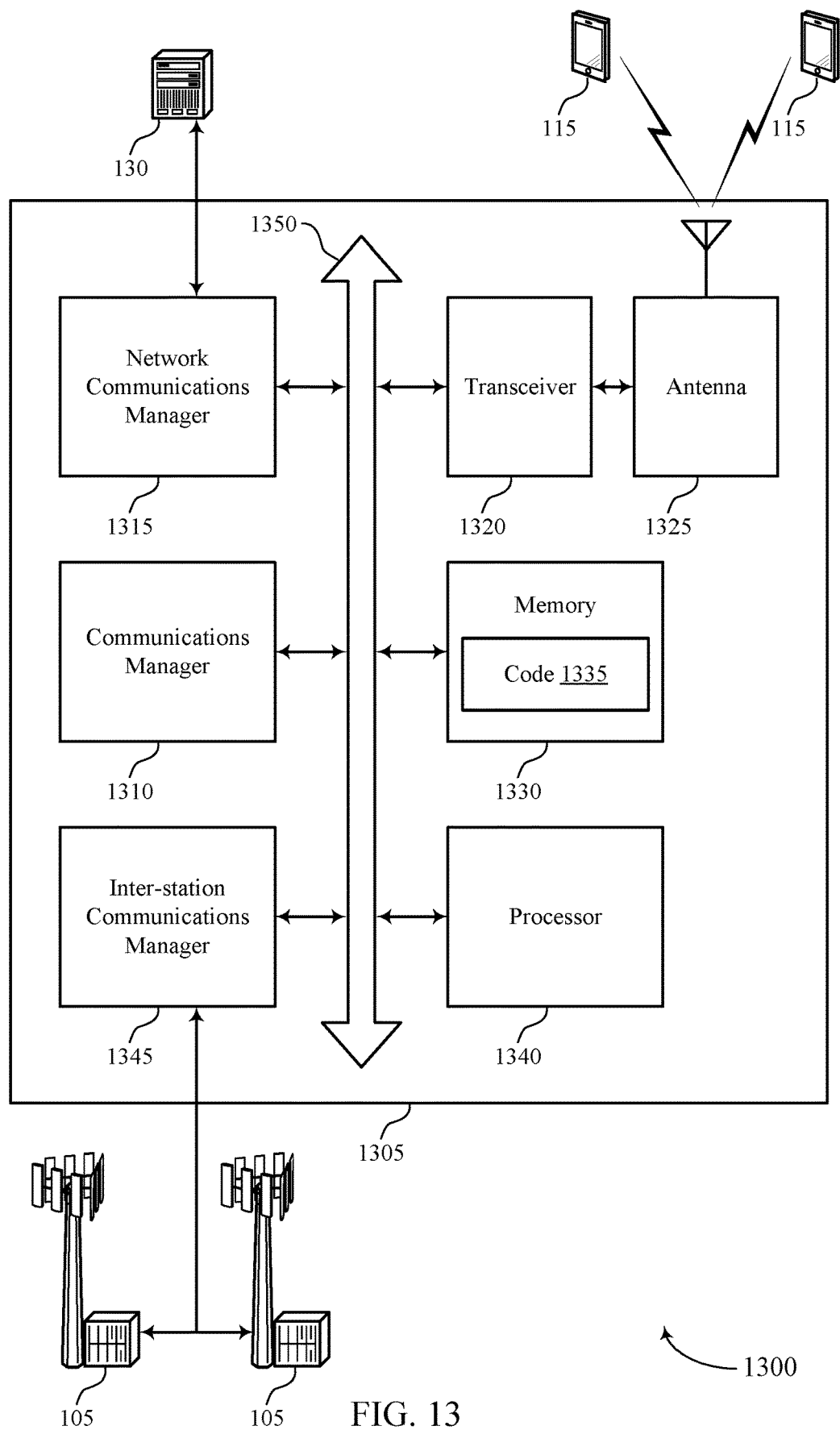
FIG. 13 shows a diagram of a system including a device that supports uplink power modification and communication scheme change requests in accordance with aspects of the present disclosure.

FIG. 13 shows a diagram of a system 1300 including a device 1305 that supports uplink power modification and communication scheme change requests in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE 115, a configuration of periodic repetition windows including a set of TTIs, each repetition window being configured for receiving a set of instances of an autonomous uplink transmission using the set of TTIs and receive, during a repetition window, instances of the autonomous uplink transmission having a transmit power increased by a power value, where the increased transmit power is based on a subset of TTIs from the set of TTIs being unavailable for receiving the instances of the autonomous uplink transmission. The communications manager 1310 may also receive, from a UE 115, a request to modify a communication scheme used for communicating with the base station on one or more carriers of a cell, the request based on a power limitation of the UE 115, where the cell is configured for high-priority communications (e.g., communications having reliability and latency requirements above a threshold level) and modify the communication scheme based on the received request, where modifying the communication scheme includes modifying a waveform, modifying a modulation order, or a combination thereof.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device to perform various functions (e.g., functions or tasks supporting uplink power modification and communication scheme change requests).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
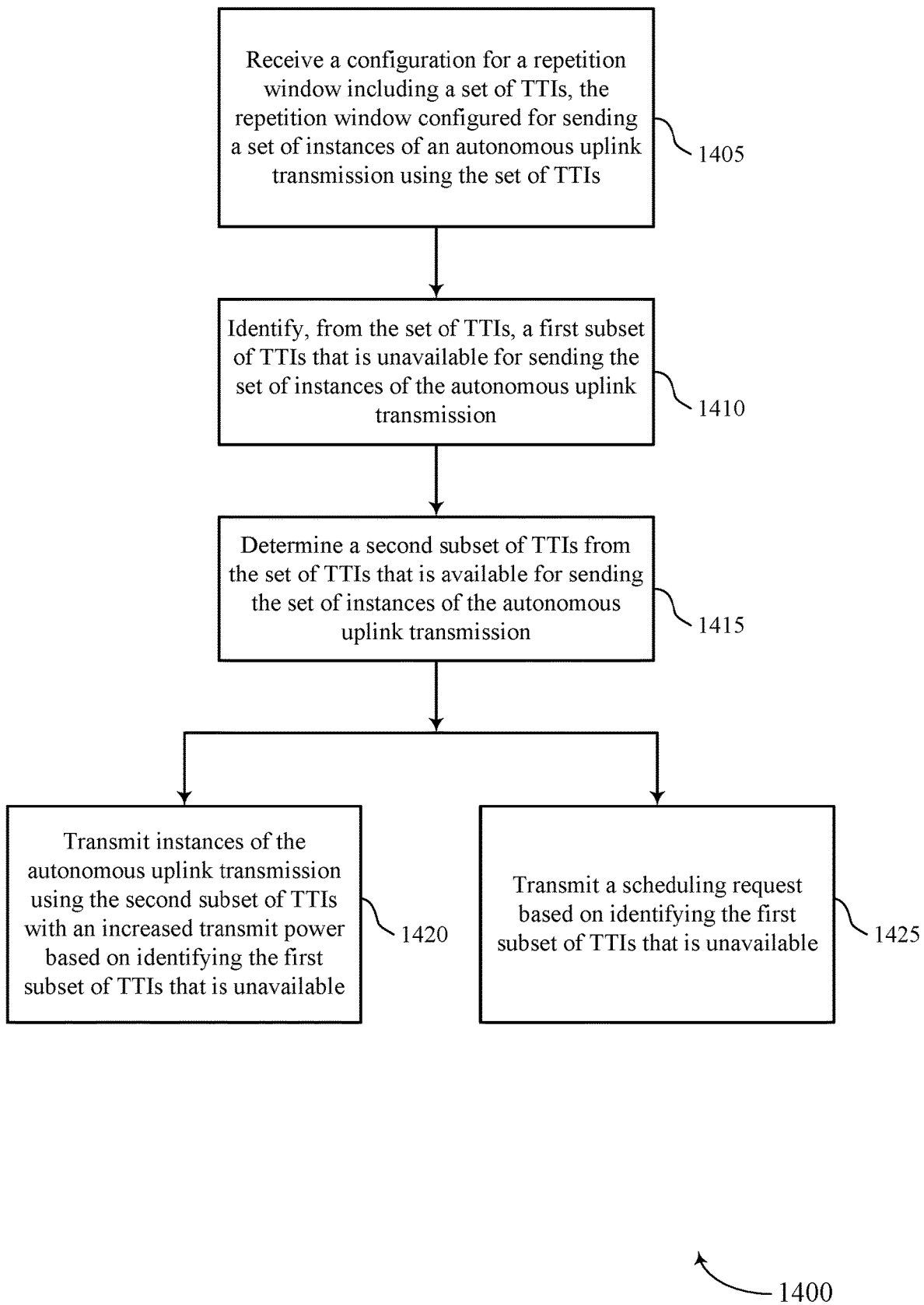
FIGS. 14 through 20 show flowcharts illustrating methods that support uplink power modification and communication scheme change requests in accordance with aspects of the present disclosure.

FIG. 14 shows a flowchart illustrating a method 1400 that supports uplink power modification and communication scheme change requests in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive a configuration for a repetition window including a set of TTIs, the repetition window configured for sending a set of instances of an autonomous uplink transmission using the set of TTIs. The operations of 1405 may be performed according to the methods described herein. In some examples, aspects of the operations of 1405 may be performed by a configuration manager as described with reference to FIGS. 6 through 9.

At 1410, the UE may identify, from the set of TTIs, a first subset of TTIs that is unavailable for sending the set of instances of the autonomous uplink transmission. The operations of 1410 may be performed according to the methods described herein. In some examples, aspects of the operations of 1410 may be performed by an uplink opportunity identifier as described with reference to FIGS. 6 through 9.

At 1415, the UE may determine a second subset of TTIs from the set of TTIs that is available for sending the set of instances of the autonomous uplink transmission. The operations of 1415 may be performed according to the methods described herein. In some examples, aspects of the operations of 1415 may be performed by an uplink opportunity identifier as described with reference to FIGS. 6 through 9.

At 1420, the UE may transmit instances of the autonomous uplink transmission using the second subset of TTIs with an increased transmit power based on identifying the first subset of TTIs that is unavailable. The operations of 1420 may be performed according to the methods described herein. In some examples, aspects of the operations of 1420 may be performed by an autonomous uplink transmission manager as described with reference to FIGS. 6 through 9.

At 1425, the UE may transmit an SR based on identifying the first subset of TTIs that is unavailable. The operations of 1420 may be performed according to the methods described herein. In some examples, aspects of the operations of 1420 may be performed by an autonomous uplink transmission manager as described with reference to FIGS. 6 through 9.

Accordingly, the described operations of method 1400 as implemented by the UE or its components may promote improved techniques for uplink power modification and communication scheme change requests which may provide an increase in system reliability (e.g., reliability of TBs transmitted to a base station) and power savings in the UE, among other advantages.

Figure 15:
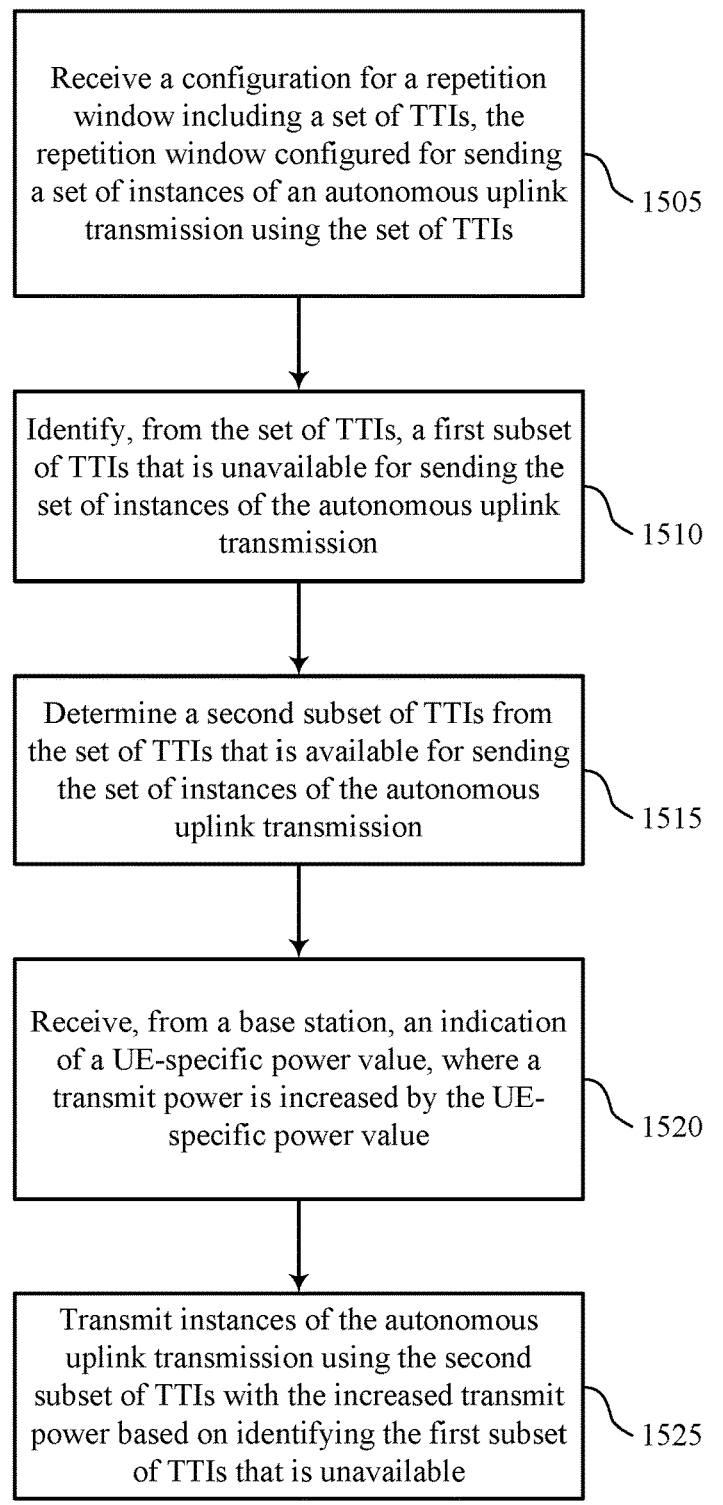

FIG. 15 shows a flowchart illustrating a method 1500 that supports uplink power modification and communication scheme change requests in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive a configuration for a repetition window including a set of TTIs, the repetition window configured for sending a set of instances of an autonomous uplink transmission using the set of TTIs. The operations of 1505 may be performed according to the methods described herein. In some examples, aspects of the operations of 1505 may be performed by a configuration manager as described with reference to FIGS. 6 through 9.

At 1510, the UE may identify, from the set of TTIs, a first subset of TTIs that is unavailable for sending the set of instances of the autonomous uplink transmission. The operations of 1510 may be performed according to the methods described herein. In some examples, aspects of the operations of 1510 may be performed by an uplink opportunity identifier as described with reference to FIGS. 6 through 9.

At 1515, the UE may determine a second subset of TTIs from the set of TTIs that is available for sending the set of instances of the autonomous uplink transmission. The operations of 1515 may be performed according to the methods described herein. In some examples, aspects of the operations of 1515 may be performed by an uplink opportunity identifier as described with reference to FIGS. 6 through 9.

At 1520, the UE may receive, from a base station, an indication of a UE-specific power value, where a transmit power is increased by the UE-specific power value. The operations of 1520 may be performed according to the methods described herein. In some examples, aspects of the operations of 1520 may be performed by a transmit power controller as described with reference to FIGS. 6 through 9.

At 1525, the UE may transmit, based at least in part on identifying the first subset of TTIs that is unavailable, instances of the autonomous uplink transmission using the second subset of TTIs with the increased transmit power, or an SR, or a combination thereof. The operations of 1525 may be performed according to the methods described herein. In some examples, aspects of the operations of 1525 may be performed by an autonomous uplink transmission manager as described with reference to FIGS. 6 through 9.

Figure 16:
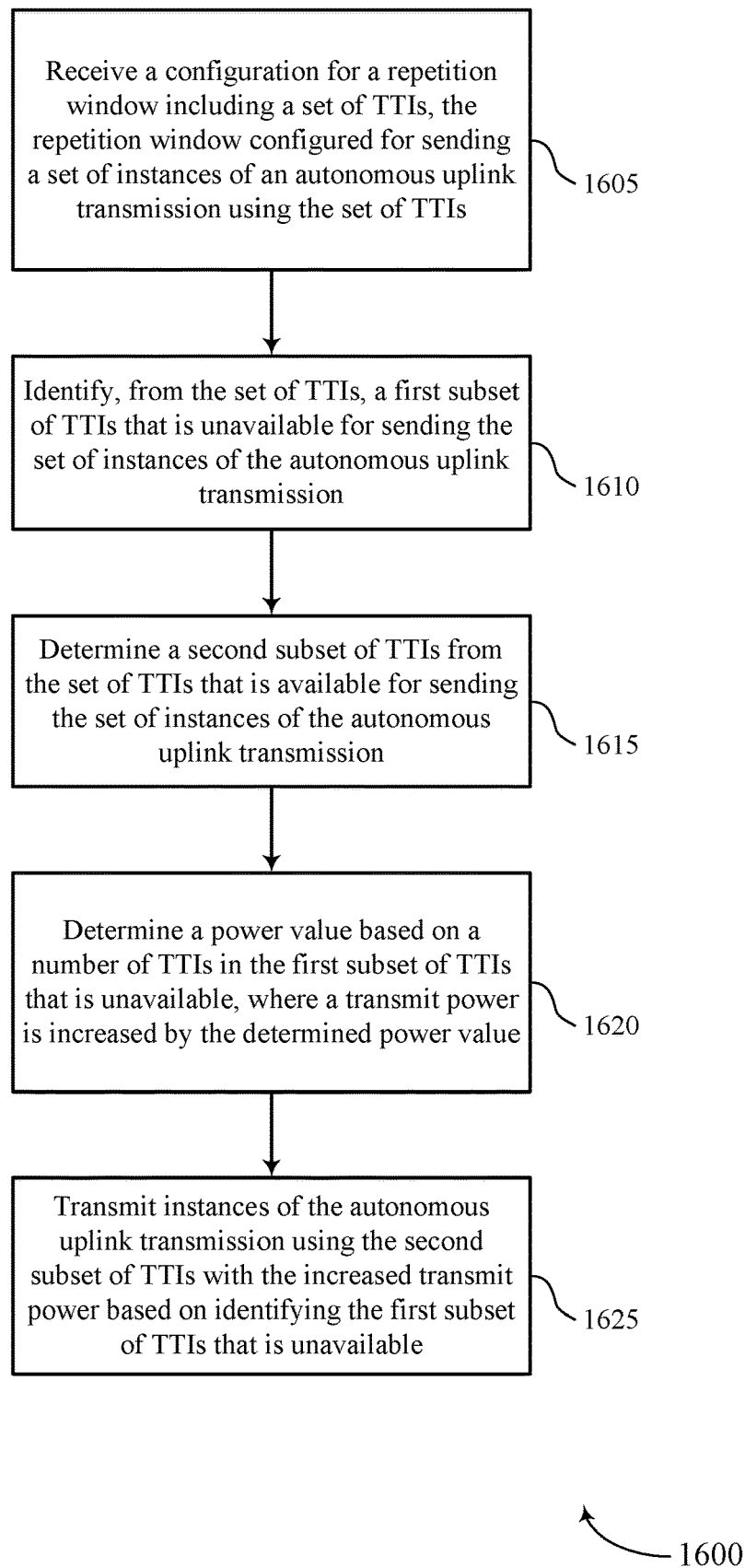

FIG. 16 shows a flowchart illustrating a method 1600 that supports uplink power modification and communication scheme change requests in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may receive a configuration for a repetition window including a set of TTIs, the repetition window configured for sending a set of instances of an autonomous uplink transmission using the set of TTIs. The operations of 1605 may be performed according to the methods described herein. In some examples, aspects of the operations of 1605 may be performed by a configuration manager as described with reference to FIGS. 6 through 9.

At 1610, the UE may identify, from the set of TTIs, a first subset of TTIs that is unavailable for sending the set of instances of the autonomous uplink transmission. The operations of 1610 may be performed according to the methods described herein. In some examples, aspects of the operations of 1610 may be performed by an uplink opportunity identifier as described with reference to FIGS. 6 through 9.

At 1615, the UE may determine a second subset of TTIs from the set of TTIs that is available for sending the set of instances of the autonomous uplink transmission. The operations of 1615 may be performed according to the methods described herein. In some examples, aspects of the operations of 1615 may be performed by an uplink opportunity identifier as described with reference to FIGS. 6 through 9.

At 1620, the UE may determine a power value based on a number of TTIs in the first subset of TTIs that is unavailable, where a transmit power is increased by the determined power value. The operations of 1620 may be performed according to the methods described herein. In some examples, aspects of the operations of 1620 may be performed by a transmit power controller as described with reference to FIGS. 6 through 9.

At 1625, the UE may transmit, based at least in part on identifying the first subset of TTIs that is unavailable, instances of the autonomous uplink transmission using the second subset of TTIs with the increased transmit power, or an SR, or a combination thereof. The operations of 1625 may be performed according to the methods described herein. In some examples, aspects of the operations of 1625 may be performed by an autonomous uplink transmission manager as described with reference to FIGS. 6 through 9.

Figure 17:
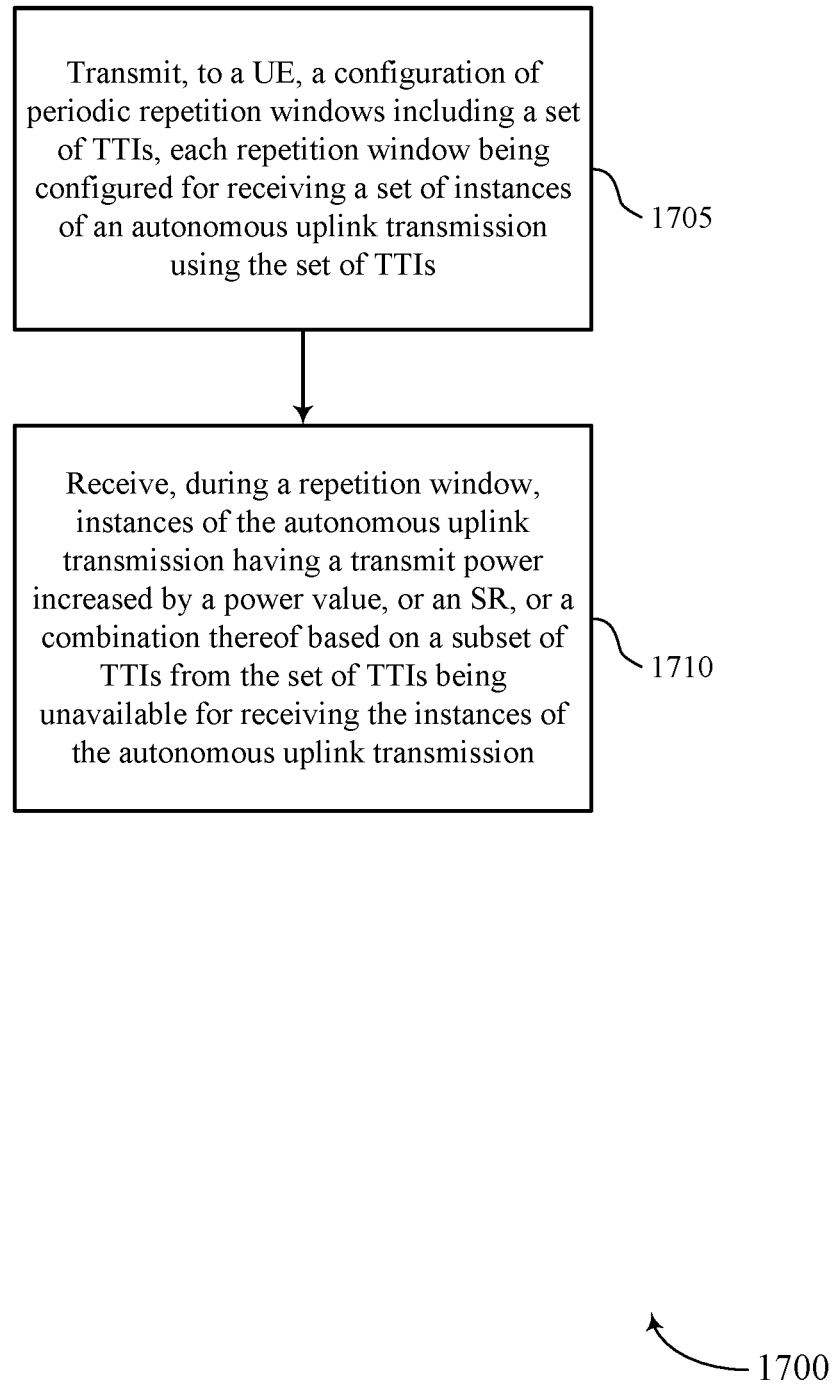

FIG. 17 shows a flowchart illustrating a method 1700 that supports uplink power modification and communication scheme change requests in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may transmit, to a UE, a configuration of periodic repetition windows including a set of TTIs, each repetition window being configured for receiving a set of instances of an autonomous uplink transmission using the set of TTIs. The operations of 1705 may be performed according to the methods described herein. In some examples, aspects of the operations of 1705 may be performed by a configuration manager as described with reference to FIGS. 10 through 13.

At 1710, the base station may receive, during a repetition window, instances of the autonomous uplink transmission having a transmit power increased by a power value, or an SR, or a combination thereof based on a subset of TTIs from the set of TTIs being unavailable for receiving the instances of the autonomous uplink transmission. The operations of 1710 may be performed according to the methods described herein. In some examples, aspects of the operations of 1710 may be performed by an autonomous uplink transmission manager as described with reference to FIGS. 10 through 13.

Figure 18:
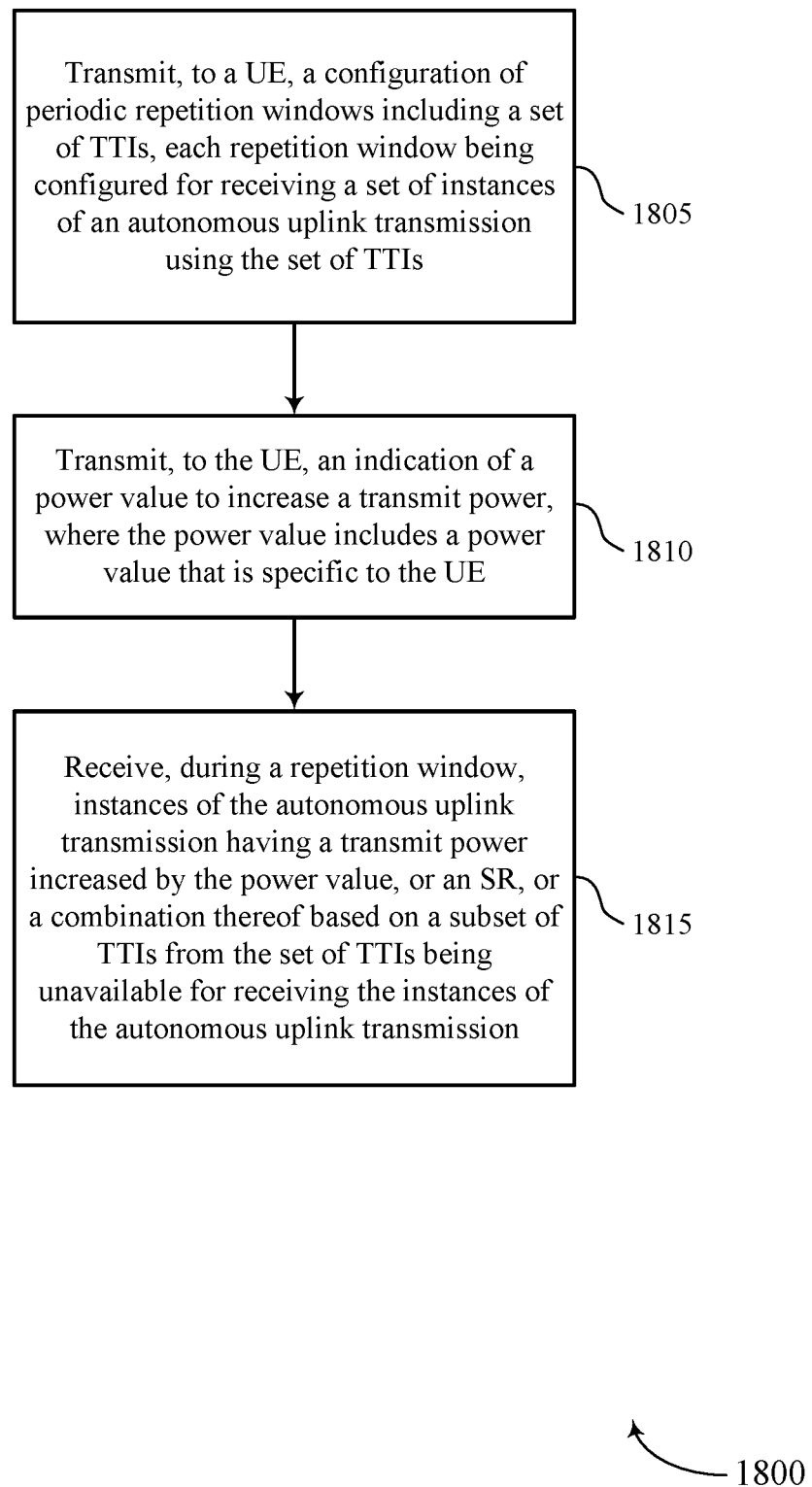

FIG. 18 shows a flowchart illustrating a method 1800 that supports uplink power modification and communication scheme change requests in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may transmit, to a UE, a configuration of periodic repetition windows including a set of TTIs, each repetition window being configured for receiving a set of instances of an autonomous uplink transmission using the set of TTIs. The operations of 1805 may be performed according to the methods described herein. In some examples, aspects of the operations of 1805 may be performed by a configuration manager as described with reference to FIGS. 10 through 13.

At 1810, the base station may transmit, to the UE, an indication of a power value to increase the transmit power, where the power value includes a power value that is specific to the UE. The operations of 1810 may be performed according to the methods described herein. In some examples, aspects of the operations of 1810 may be performed by a transmit power controller as described with reference to FIGS. 10 through 13.

At 1815, the base station may receive, during a repetition window, instances of the autonomous uplink transmission having a transmit power increased by the power value, where the increased transmit power is based on a subset of TTIs from the set of TTIs being unavailable for receiving the instances of the autonomous uplink transmission. The operations of 1815 may be performed according to the methods described herein. In some examples, aspects of the operations of 1815 may be performed by an autonomous uplink transmission manager as described with reference to FIGS. 10 through 13.

Figure 19:
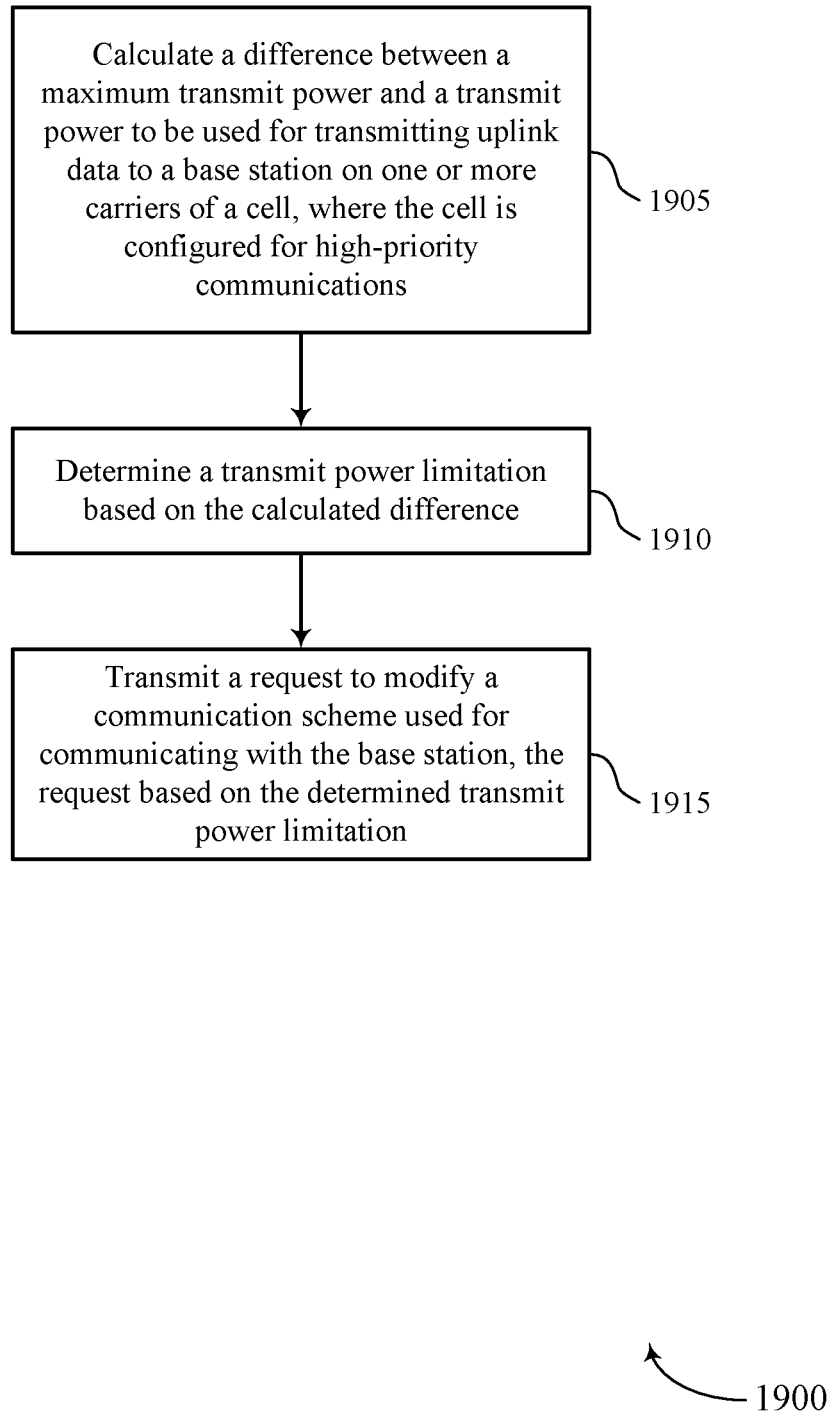

FIG. 19 shows a flowchart illustrating a method 1900 that supports uplink power modification and communication scheme change requests in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1905, the UE may calculate a difference between a maximum transmit power and a transmit power to be used for transmitting uplink data to a base station on one or more carriers of a cell, where the cell is configured for high-priority communications (e.g., URLLC). The operations of 1905 may be performed according to the methods described herein. In some examples, aspects of the operations of 1905 may be performed by a power headroom manager as described with reference to FIGS. 6 through 9.

At 1910, the UE may determine a transmit power limitation based on the calculated difference. The operations of 1910 may be performed according to the methods described herein. In some examples, aspects of the operations of 1910 may be performed by a transmit power controller as described with reference to FIGS. 6 through 9.

At 1915, the UE may transmit a request to modify a communication scheme used for communicating with the base station, the request based on the determined transmit power limitation. The operations of 1915 may be performed according to the methods described herein. In some examples, aspects of the operations of 1915 may be performed by a communication scheme manager as described with reference to FIGS. 6 through 9.

Figure 20:
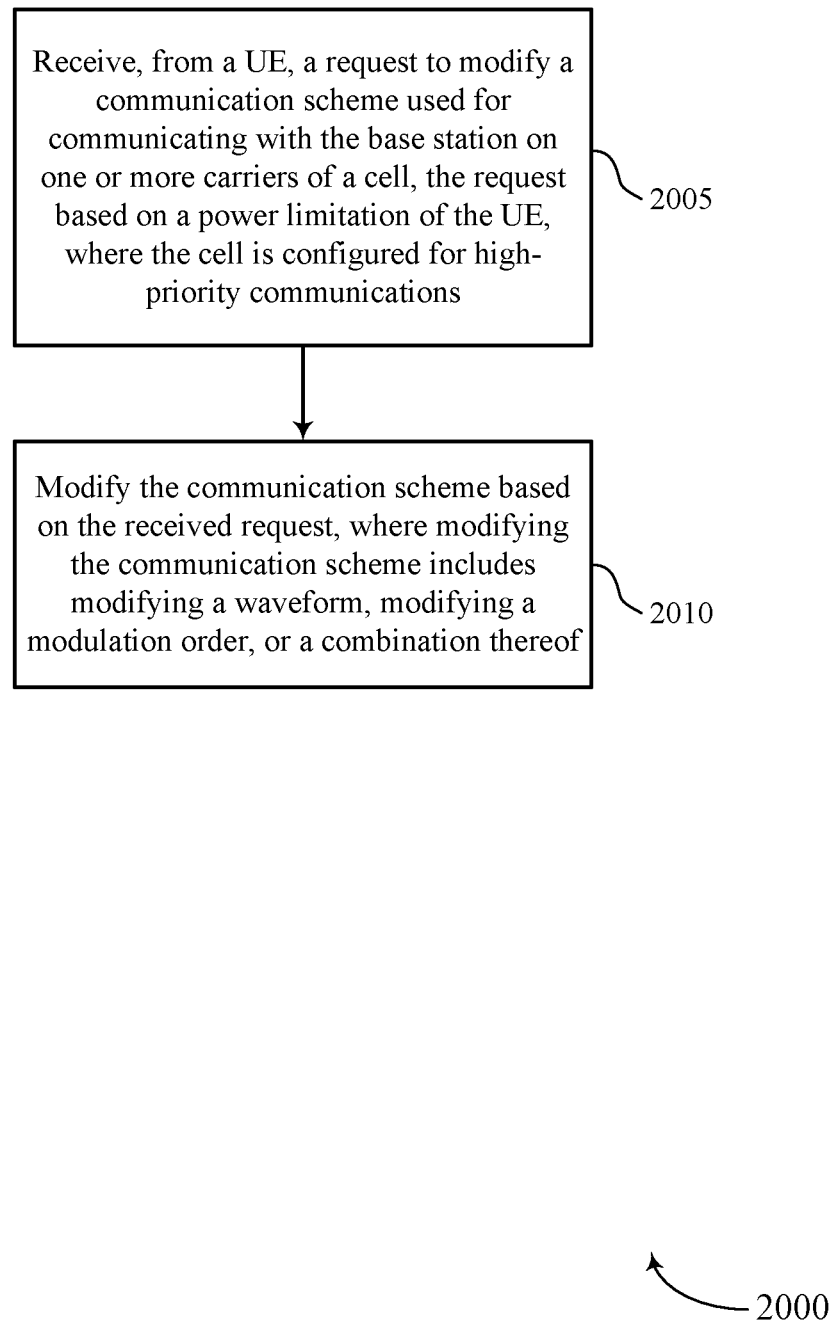

FIG. 20 shows a flowchart illustrating a method 2000 that supports uplink power modification and communication scheme change requests in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2005, the base station may receive, from a UE, a request to modify a communication scheme used for communicating with the base station on one or more carriers of a cell, the request based on a power limitation of the UE, where the cell is configured for high-priority communications (e.g., communications having reliability and latency requirements above a threshold level). The operations of 2005 may be performed according to the methods described herein. In some examples, aspects of the operations of 2005 may be performed by a request component as described with reference to FIGS. 10 through 13.

At 2010, the base station may modify the communication scheme based on the received request, where modifying the communication scheme includes modifying a waveform, modifying a modulation order, or a combination thereof. The operations of 2010 may be performed according to the methods described herein. In some examples, aspects of the operations of 2010 may be performed by a communication scheme manager as described with reference to FIGS. 10 through 13.

Accordingly, the described operations of method 2000 as implemented by the base station or its components may promote improved techniques for uplink power modification and communication scheme change requests which may provide an increase in system reliability (e.g., reliability of transport blocks (TBs) received from a UE), among other advantages.

It should be noted that the methods described herein describe possible implementations, and that the operations and the steps may be rearranged or otherwise modified and that other implementations are possible. Further, aspects from two or more of the methods may be combined.

Embodiment 1: A method for wireless communication at a user equipment (UE), comprising: receiving a configuration for a repetition window comprising a set of transmission time intervals (TTIs), the repetition window configured for sending a plurality of instances of an autonomous uplink transmission using the set of TTIs; identifying, from the set of TTIs, a first subset of TTIs that is unavailable for sending the plurality of instances of the autonomous uplink transmission; determining a second subset of TTIs from the set of TTIs that is available for sending the plurality of instances of the autonomous uplink transmission; and transmitting, based at least in part on identifying the first subset of TTIs that is unavailable, instances of the autonomous uplink transmission using the second subset of TTIs with an increased transmit power, or a scheduling request (SR), or a combination thereof.

Embodiment 2: The method of embodiment 1, further comprising: receiving, from a base station, an indication of a UE-specific power value, wherein the transmit power is increased by the UE-specific power value.

Embodiment 3: The method of any of embodiments 1 or 2, wherein the configuration is received via radio resource control (RRC) signaling.

Embodiment 4: The method of any of embodiments 1 to 3, wherein the configuration is received via signaling that activates or modifies autonomous uplink transmissions at the UE.

Embodiment 5: The method of any of embodiments 1 to 4, further comprising: determining a power value based at least in part on a number of TTIs in the first subset of TTIs that is unavailable, wherein the transmit power is increased by the determined power value.

Embodiment 6: The method of any of embodiments 1 to 5, further comprising: determining a power value based at least in part on a ratio between a first number of TTIs in the first subset of TTIs and a second number of TTIs in the second subset of TTIs, wherein the transmit power is increased by the determined power value.

Embodiment 7: The method of any of embodiments 1 to 4, further comprising: determining a preconfigured power value based on a presence of the first subset of TTIs that is unavailable, wherein the transmit power is increased by the preconfigured power value.

Embodiment 8: The method of any of embodiments 1 to 7, further comprising: receiving a resource grant for a set of uplink resources in response to transmitting the SR; and transmitting data on the set of uplink resources based at least in part on the first subset of TTIs that is unavailable.

Embodiment 9: The method of any of embodiments 1 to 8, wherein the first subset of TTIs that is unavailable comprises TTIs configured for downlink transmissions, TTIs having reserved resources, or a combination thereof.

Embodiment 10: The method of any of embodiments 1 to 9, wherein the set of TTIs comprises a set of respective slots, mini-slots, symbol periods, or a combination thereof.

Embodiment 11: A method for wireless communication at a base station, comprising: transmitting, to a user equipment (UE), a configuration of periodic repetition windows comprising a set of transmission time intervals (TTIs), each repetition window being configured for receiving a plurality of instances of an autonomous uplink transmission using the set of TTIs; and receiving, during a repetition window, instances of the autonomous uplink transmission having a transmit power increased by a power value, or a scheduling request (SR), or a combination thereof based at least in part on a subset of TTIs from the set of TTIs being unavailable for receiving the instances of the autonomous uplink transmission.

Embodiment 12: The method of embodiment 11, further comprising: transmitting, to the UE, an indication of the power value to increase the transmit power, wherein the power value comprises a power value that is specific to the UE.

Embodiment 13: The method of any of embodiments 11 or 12, wherein the indication is transmitted via radio resource control (RRC) signaling.

Embodiment 14: The method of any of embodiments 11 to 13, wherein the indication is transmitted via signaling that activates or modifies autonomous uplink transmissions at the UE.

Embodiment 15: The method of any of embodiments 11 to 14, wherein the power value is based at least in part on a number of TTIs in the subset of TTIs.

Embodiment 16: The method of any of embodiments 11 to 15, wherein the power value is based at least in part on a ratio between a first number of TTIs in the subset of TTIs and a second number of TTIs in a second subset of TTIs that is available for receiving the instances of the autonomous uplink transmission.

Embodiment 17: The method of any of embodiments 11 to 14, further comprising: determining a preconfigured power value to increase the transmit power based on a presence of the subset of TTIs that is unavailable, wherein the transmit power is increased by the preconfigured power value.

Embodiment 18: The method of any of embodiments 11 to 17, further comprising: configuring a set of uplink resources in response to receiving the SR; and transmitting a resource grant indicating the set of uplink resources.

Embodiment 19: The method of any of embodiments 11 to 18, wherein the subset of TTIs comprises TTIs configured for downlink transmissions, TTIs having reserved resources, or a combination thereof.

Embodiment 20: A method for wireless communication at a user equipment (UE), comprising: calculating a difference between a maximum transmit power and a transmit power to be used for transmitting uplink data to a base station on one or more carriers of a cell, wherein the cell is configured for high-priority communications; determining a transmit power limitation based at least in part on the calculated difference; and transmitting a request to modify a communication scheme used for communicating with the base station, the request based at least in part on the determined transmit power limitation.

Embodiment 21: The method of embodiment 20, wherein transmitting the request to modify the communication scheme comprises: transmitting the request via a medium access control (MAC) control element (CE), scheduling request (SR) resources, a set of configured resources, or a combination thereof.

Embodiment 22: The method of any of embodiments 20 or 21, wherein determining the transmit power limitation comprises: determining that the difference between the maximum transmit power and the transmit power to be used for transmitting uplink data satisfies a threshold, wherein the request to modify the communication scheme is transmitted based at least in part on the difference satisfying the threshold.

Embodiment 23: The method of any of embodiments 20 to 22, further comprising: determining that path loss for one or more downlink reference signals in the cell satisfies a path loss threshold, wherein transmitting the request to modify the communication scheme is based at least in part on the path loss satisfying the path loss threshold.

Embodiment 24: The method of any of embodiments 20 to 23, wherein the request to modify the communication scheme comprises a request for a waveform change, a request for a modulation order change, or a combination thereof.

Embodiment 25: The method of any of embodiments 20 to 24, wherein the high-priority communications comprise communications having reliability and latency requirements above a threshold level.

Embodiment 26: A method for wireless communication at a base station, comprising: receiving, from a user equipment (UE), a request to modify a communication scheme used for communicating with the base station on one or more carriers of a cell, the request based at least in part on a power limitation of the UE, wherein the cell is configured for high-priority communications; and modifying the communication scheme based at least in part on the received request, wherein modifying the communication scheme comprises modifying a waveform, modifying a modulation order, or a combination thereof.

Embodiment 27: The method of embodiment 26, further comprising: modifying the communication scheme based at least in part on coordinating interference reduction with one or more neighboring cells.

Embodiment 28: The method of any of embodiments 26 or 27, further comprising: transmitting, to the UE, an indication of a set of configured resources for sending the request to modify the communication scheme, wherein the request is received on the set of configured resources.

Embodiment 29: The method of any of embodiments 26 to 28, wherein receiving the request to modify the communication scheme comprises: receiving the request via a medium access control (MAC) control element (CE), scheduling request (SR) resources, a set of configured resources, or a combination thereof.

Embodiment 30: The method of any of embodiments 26 to 29, wherein the high-priority communications comprise reliability and latency requirements above a threshold level.

Embodiment 31: An apparatus comprising at least one means for performing a method of any of embodiments 1 to 10.

Embodiment 32: An apparatus for wireless communications comprising a processor; memory in electronic communication with the processor; and instructions stored in the memory and executable by the processor to cause the apparatus to perform a method of any of embodiments 1 to 10.

Embodiment 33: A non-transitory computer-readable medium storing code for wireless communications, the code comprising instructions executable by a processor to perform a method of any of embodiments 1 to 10.

Embodiment 34: An apparatus comprising at least one means for performing a method of any of embodiments 11 to 19.

Embodiment 35: An apparatus for wireless communications comprising a processor; memory in electronic communication with the processor; and instructions stored in the memory and executable by the processor to cause the apparatus to perform a method of any of embodiments 11 to 19.

Embodiment 36: A non-transitory computer-readable medium storing code for wireless communications, the code comprising instructions executable by a processor to perform a method of any of embodiments 11 to 19.

Embodiment 37: An apparatus comprising at least one means for performing a method of any of embodiments 20 to 25.

Embodiment 38: An apparatus for wireless communications comprising a processor; memory in electronic communication with the processor; and instructions stored in the memory and executable by the processor to cause the apparatus to perform a method of any of embodiments 20 to 25.

Embodiment 39: A non-transitory computer-readable medium storing code for wireless communications, the code comprising instructions executable by a processor to perform a method of any of embodiments 20 to 25.

Embodiment 40: An apparatus comprising at least one means for performing a method of any of embodiments 26 to 30.

Embodiment 41: An apparatus for wireless communications comprising a processor; memory in electronic communication with the processor; and instructions stored in the memory and executable by the processor to cause the apparatus to perform a method of any of embodiments 26 to 30.

Embodiment 42: A non-transitory computer-readable medium storing code for wireless communications, the code comprising instructions executable by a processor to perform a method of any of embodiments 26 to 30.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a configuration for a repetition window comprising a set of transmission time intervals (TTIs), the repetition window configured for sending a plurality of instances of an autonomous uplink transmission using the set of TTIs;
   identifying, from the set of TTIs, a first subset of TTIs that is unavailable for sending the plurality of instances of the autonomous uplink transmission;
   determining a second subset of TTIs from the set of TTIs that is available for sending the plurality of instances of the autonomous uplink transmission; and
   transmitting, based at least in part on identifying the first subset of TTIs that is unavailable, instances of the autonomous uplink transmission using the second subset of TTIs with an increased transmit power, or a scheduling request (SR), or a combination thereof.

2. The method of claim 1, further comprising:
   receiving, from a base station, an indication of a UE-specific power value, wherein the transmit power is increased by the UE-specific power value.

3. The method of claim 2, wherein the configuration is received via radio resource control (RRC) signaling.

4. The method of claim 2, wherein the configuration is received via signaling that activates or modifies autonomous uplink transmissions at the UE.

5. The method of claim 1, further comprising:
   determining a power value based at least in part on a number of TTIs in the first subset of TTIs that is unavailable, wherein the transmit power is increased by the determined power value.

6. The method of claim 1, further comprising:
   determining a power value based at least in part on a ratio between a first number of TTIs in the first subset of TTIs and a second number of TTIs in the second subset of TTIs, wherein the transmit power is increased by the determined power value.

7. The method of claim 1, further comprising:
   determining a preconfigured power value based on a presence of the first subset of TTIs that is unavailable, wherein the transmit power is increased by the preconfigured power value.

8. The method of claim 1, further comprising:
   receiving a resource grant for a set of uplink resources in response to transmitting the SR; and
   transmitting data on the set of uplink resources based at least in part on the first subset of TTIs that is unavailable.

9. The method of claim 1, wherein the first subset of TTIs that is unavailable comprises TTIs configured for downlink transmissions, TTIs having reserved resources, or a combination thereof.

10. The method of claim 1, wherein the set of TTIs comprises a set of respective slots, mini-slots, symbol periods, or a combination thereof.

11. A method for wireless communication at a base station, comprising:
    transmitting, to a user equipment (UE), a configuration of periodic repetition windows comprising a set of transmission time intervals (TTIs), each repetition window being configured for receiving a plurality of instances of an autonomous uplink transmission using the set of TTIs; and
    receiving, during a repetition window, instances of the autonomous uplink transmission having a transmit power increased by a power value, or a scheduling request (SR), or a combination thereof based at least in part on a subset of TTIs from the set of TTIs being unavailable for receiving the instances of the autonomous uplink transmission.

12. The method of claim 11, further comprising:
    transmitting, to the UE, an indication of the power value to increase the transmit power, wherein the power value comprises a UE-specific power value.

13. The method of claim 12, wherein the indication is transmitted via radio resource control (RRC) signaling.

14. The method of claim 12, wherein the indication is transmitted via signaling that activates or modifies autonomous uplink transmissions at the UE.

15. The method of claim 11, wherein the power value is based at least in part on a number of TTIs in the subset of TTIs.

16. The method of claim 11, wherein the power value is based at least in part on a ratio between a first number of TTIs in the subset of TTIs and a second number of TTIs in a second subset of TTIs that is available for receiving the instances of the autonomous uplink transmission.

17. The method of claim 11, further comprising:
    determining a preconfigured power value to increase the transmit power based on a presence of the subset of TTIs that is unavailable, wherein the transmit power is increased by the preconfigured power value.

18. The method of claim 11, further comprising:
    configuring a set of uplink resources in response to receiving the SR; and
    transmitting a resource grant indicating the set of uplink resources.

19. The method of claim 11, wherein the subset of TTIs comprises TTIs configured for downlink transmissions, TTIs having reserved resources, or a combination thereof.

20. An apparatus for wireless communication at a user equipment (UE), comprising:
    a processor; memory in electronic communication with the processor; and instructions stored in the memory, the instructions executable by the processor to cause the apparatus to:
receive a configuration for a repetition window including a set of TTIs, the repetition window configured for sending a set of instances of an autonomous uplink transmission using the set of TTIs;
identify, from the set of TTIs, a first subset of TTIs that is unavailable for sending the set of instances of the autonomous uplink transmission;
determine a second subset of TTIs from the set of TTIs that is available for sending the set of instances of the autonomous uplink transmission; and
transmit, based at least in part on identifying the first subset of TTIs that is unavailable, instances of the autonomous uplink transmission using the second subset of TTIs with an increased transmit power, or a scheduling request (SR), or a combination thereof.

21. The apparatus of claim 20, wherein the instructions are further executable by the processor to cause the apparatus to
receive, from a base station, an indication of a UE-specific power value, wherein the transmit power is increased by the UE-specific power value.

22. The apparatus of claim 21, wherein the configuration is received via radio resource control (RRC) signaling.

23. The apparatus of claim 21, wherein the configuration is received via signaling that activates or modifies autonomous uplink transmissions at the UE.

24. The apparatus of claim 20, wherein the instructions are further executable by the processor to cause the apparatus to:
determine a power value based at least in part on a number of TTIs in the first subset of TTIs that is unavailable, wherein the transmit power is increased by the determined power value.

25. The apparatus of claim 20, wherein the instructions are further executable by the processor to cause the apparatus to:
determine a power value based at least in part on a ratio between a first number of TTIs in the first subset of TTIs and a second number of TTIs in the second subset of TTIs, wherein the transmit power is increased by the determined power value.

26. The apparatus of claim 20, wherein the instructions are further executable by the processor to cause the apparatus to:
determine a preconfigured power value based on a presence of the first subset of TTIs that is unavailable, wherein the transmit power is increased by the preconfigured power value.

27. The apparatus of claim 20, wherein the instructions are further executable by the processor to cause the apparatus to:
receive a resource grant for a set of uplink resources in response to transmitting the SR; and
transmit data on the set of uplink resources based at least in part on the first subset of TTIs that is unavailable.

28. The apparatus of claim 20, wherein the first subset of TTIs that is unavailable comprises TTIs configured for downlink transmissions, TTIs having reserved resources, or a combination thereof.

29. The apparatus of claim 20, wherein the set of TTIs comprises a set of respective slots, mini-slots, symbol periods, or a combination thereof.

30. An apparatus for wireless communication at a base station, comprising:
a processor;
memory coupled with the processor; and
instructions stored in the memory and executable by the processor to cause the apparatus to:
transmit, to a user equipment (UE), a configuration of periodic repetition windows comprising a set of transmission time intervals (TTIs), each repetition window being configured for receiving a plurality of instances of an autonomous uplink transmission using the set of TTIs; and
receive, during a repetition window, instances of the autonomous uplink transmission having a transmit power increased by a power value, or a scheduling request (SR), or a combination thereof based at least in part on a subset of TTIs from the set of TTIs being unavailable for receiving the instances of the autonomous uplink transmission.

* * * * *